US012578204B2

(12) United States Patent
Liu et al.

(10) Patent No.: US 12,578,204 B2
(45) Date of Patent: Mar. 17, 2026

(54) METHOD AND APPARATUS FOR AUTOMATICALLY MARKING U-TURN LANE LINE, COMPUTER-READABLE STORAGE MEDIUM, AND MAP

(71) Applicant: Shenzhen Yinwang Intelligent Technologies Co., Ltd., Shenzhen (CN)

(72) Inventors: Dawei Liu, Beijing (CN); Feng Shi, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 182 days.

(21) Appl. No.: 18/306,719

(22) Filed: Apr. 25, 2023

(65) Prior Publication Data

US 2023/0266141 A1 Aug. 24, 2023

Related U.S. Application Data

(63) Continuation of application No. PCT/CN2021/122918, filed on Oct. 9, 2021.

(30) Foreign Application Priority Data

Oct. 27, 2020 (CN) .......................... 202011162311.X

(51) Int. Cl.
| | |
|---|---|
| G01C 21/00 | (2006.01) |
| G01C 21/34 | (2006.01) |
| G06T 11/20 | (2006.01) |
| G08G 1/0967 | (2006.01) |
| G08G 1/0969 | (2006.01) |
| G08G 1/16 | (2006.01) |

(52) U.S. Cl.
CPC ..... G01C 21/3819 (2020.08); G01C 21/3415 (2013.01); G06T 11/203 (2013.01); G08G 1/096725 (2013.01); G08G 1/0969 (2013.01); G08G 1/167 (2013.01)

(58) Field of Classification Search
None
See application file for complete search history.

(56) References Cited

U.S. PATENT DOCUMENTS

| | | | |
|---|---|---|---|
| 2011/0054783 A1 | 3/2011 | Kishikawa et al. | |
| 2018/0297596 A1 | 10/2018 | Li et al. | |
| 2018/0370532 A1 | 12/2018 | Schein et al. | |

(Continued)

FOREIGN PATENT DOCUMENTS

| | | |
|---|---|---|
| CN | 109472844 A | 3/2019 |
| CN | 109740484 A | 5/2019 |

(Continued)

*Primary Examiner* — Vivek D Koppikar
*Assistant Examiner* — David Ruben Pedersen
(74) *Attorney, Agent, or Firm* — Conley Rose, P.C.

(57) ABSTRACT

A method for automatically marking a U-turn lane line includes: obtaining information about an intersection entry point, information about an intersection exit point, and information about an obstacle at a to-be-marked intersection; and marking a U-turn lane line with a first depth. The first depth is determined based on a second depth of the obstacle. The first depth of the U-turn lane line is determined based on the second depth of the obstacle, so that a marked U-turn lane line does not collide with the obstacle, to mark a more proper U-turn lane line.

20 Claims, 12 Drawing Sheets

(56)                    References Cited

U.S. PATENT DOCUMENTS

2020/0290651 A1      9/2020  Pan et al.
2021/0001877 A1 *   1/2021  Han ...................... B60W 40/02

FOREIGN PATENT DOCUMENTS

CN          109878515 A       6/2019
CN          111332285 A       6/2020
CN          111710159 A  *   9/2020   ........... G08G 1/0125
EP            3473980 A1      4/2019
JP          2006213162 A      8/2006
JP          2009176223 A      8/2009
WO     WO-2017082858 A1 *  5/2017   ......... G01C 21/3461

* cited by examiner

METHOD AND APPARATUS FOR AUTOMATICALLY MARKING U-TURN LANE LINE, COMPUTER-READABLE STORAGE MEDIUM, AND MAP

CROSS-REFERENCE TO RELATED APPLICATIONS

This is a continuation of Int'l Patent App. No. PCT/CN2021/122918 filed on Oct. 9, 2021, which claims priority to Chinese Patent App. No. 202011162311.X filed on Oct. 27, 2020, both of which are incorporated by reference.

FIELD

This disclosure relates to the field of intelligent transportation technologies, specifically to the field of high-definition maps, and in particular, to a method and apparatus for automatically marking a U-turn lane line, a computer-readable storage medium, and a map.

BACKGROUND

A high-definition map plays an important role in scenarios such as location search, automatic navigation, and even self-driving. In a self-driving process, a self-driving vehicle travels according to a route planned in advance on the high-definition map, and the route needs to be accurate at least to a lane level.

A map making process of the high-definition map is generally as follows: A technical person drives a map collection vehicle, collects surrounding environment information of a region through which the vehicle passes, and performs fusion processing on various types of collected information to generate an electronic map with colors. Then, a map making person uses various types of map marking software to automatically or manually mark traffic information of various traffic entities on the obtained electronic map, for example, traffic information such as lane lines, traffic signs, and road marks. In addition, the map making person further marks some virtual traffic information, for example, a virtual U-turn lane line at an intersection.

There are two marking methods for the virtual U-turn lane line at the intersection: manual marking and automatic marking. Manual marking is generally performed by the map making person based on a point cloud map. Manually marking a U-turn lane line is time-consuming and labor-consuming. In addition, it is difficult to ensure smoothness and aesthetics of a curve, affecting travel stability of a vehicle to some extent. Automatic marking is performed based on intersection information. Generally, the U-turn lane line is automatically generated based on an intersection entry point, an intersection exit point, and a U-turn depth.

In some approaches, a specific method for the automatic marking is: determining that an intersection point between an entry lane line and an intersection is an intersection entry point, and an intersection point between an exit lane line and the intersection is an intersection exit point; obtaining U-turn depth information; and automatically generating a U-turn lane line based on the intersection entry point, the intersection exit point, and a U-turn depth.

In other approaches, obstacle scenarios such as a curbstone and an isolation belt at a U-turn are not considered during the automatic marking, and a generated lane line may collide with an obstacle at the U-turn because the obstacle is not processed. Therefore, in the other approaches, even if the U-turn lane line is automatically generated, the map making person still needs to perform manual adjustment.

SUMMARY

In view of the foregoing problems, an objective of embodiments of this disclosure is to provide a method for automatically marking a U-turn lane line, an apparatus for automatically marking a U-turn lane line, a computer readable storage medium, and a map, to generate a more proper U-turn lane line used for a U-turn at a U-turn intersection. Therefore, a manual adjustment time is not implemented or is reduced.

To achieve the foregoing objective, a first aspect provides a method for automatically marking a U-turn lane line. The method includes the following steps: obtaining information about a to-be-marked intersection, where the information about the to-be-marked intersection includes information about an intersection entry point, information about an intersection exit point, and information about an obstacle that is higher than a road surface of a road on which a vehicle travels and that hinders a U-turn of the vehicle at the to-be-marked intersection, the intersection entry point is determined based on an endpoint of an entry lane line of the to-be-marked intersection, and the intersection exit point is determined based on an endpoint of an exit lane line of the to-be-marked intersection; and marking a U-turn lane line with a first depth, where the first depth is determined based on a second depth of the obstacle, the first depth is a depth at which the U-turn lane line extends from the intersection entry point or the intersection exit point to the to-be-marked intersection, and the second depth is a distance from a farthest projection end of the obstacle on an extension line of the entry lane line to the to-be-marked intersection to the intersection entry point, or the second depth is a distance from a farthest projection end of the obstacle on an extension line of the exit lane line to the to-be-marked intersection to the intersection exit point.

Herein, the first depth may be a distance from a farthest projection end of the U-turn lane line on the extension line of the entry lane line to the to-be-marked intersection to the intersection entry point. Alternatively, the first depth may be a distance from a farthest projection end of the U-turn lane line on the extension line of the exit lane line to the to-be-marked intersection to the intersection exit point.

In this manner, when there is the obstacle, the first depth of the U-turn lane line is determined based on the farthest projection end of the obstacle on the extension line of the entry lane line or the exit lane line. Therefore, in comparison with a case in which there is no obstacle, the U-turn lane line that extends to the to-be-marked intersection at a relatively large depth can be automatically marked, to avoid collision with the obstacle during a U-turn of the vehicle. In this way, the automatically marked U-turn lane line does not need to be manually adjusted, or a time used for manual adjustment can be reduced.

In a possible implementation of the first aspect, the U-turn lane line includes a straight-line part and a curve part; and the first depth includes a straight-line depth of the straight-line part and a curve depth of the curve part, and the straight-line depth is determined based on the intersection entry point, the intersection exit point, and the farthest projection end of the obstacle.

In this manner, the U-turn lane line includes the straight-line part and the curve part, so that the marked U-turn lane line can better conform to an actual travel track of the vehicle.

In a possible implementation of the first aspect, the straight line part includes a first straight line part with a first straight line depth and a second straight line part with a second straight line depth, the first straight line part extends from the intersection entry point to the to-be-marked intersection, and the second straight line part extends from the intersection exit point to the to-be-marked intersection; and the curve part is connected between the first straight line part and the second straight line part.

In a possible implementation of the first aspect, the first straight line depth is a distance from the farthest projection end of the obstacle on the extension line of the entry lane line to the to-be-marked intersection to the intersection entry point, and the second straight line depth is a distance from the farthest projection end of the obstacle on the extension line of the exit lane line to the to-be-marked intersection to the intersection exit point.

In this manner, the first straight line depth and the second straight line depth are respectively determined based on the farthest projection ends of the obstacle on the extension lines of the entry lane line and the exit lane line to the to-be-marked intersection. Therefore, a more proper straight-line depth in an entry direction and a more proper straight-line depth in an exit direction can be determined, so that the marked U-turn lane line can better conform to an actual travel track of the vehicle.

In a possible implementation of the first aspect, the curve depth is determined based on the farthest projection end of the obstacle on the extension line of the entry lane line to the to-be-marked intersection, the farthest projection end of the obstacle on the extension line of the exit lane line to the to-be-marked intersection, and vehicle length information.

Herein, the farthest projection end of the obstacle on the extension line of the entry lane line to the to-be-marked intersection may be used as a start point of the curve part, and the farthest projection end of the obstacle on the extension line of the exit lane line to the to-be-marked intersection is used as an end point. At least one control point is determined based on the vehicle length information, to determine the curve part and further determine the curve depth. In addition, the curve part may be determined by using a Bézier curve or a spline curve.

In this manner, the curve depth of the curve part is further determined based on the vehicle length information, and a proper U-turn lane line can be marked based on different vehicle types such as a car and a truck, so that the marked U-turn lane line better conforms to an actual travel track of the vehicle.

In a possible implementation of the first aspect, the obtaining the information about the obstacle includes: constructing a planned U-turn region based on the intersection entry point, the intersection exit point, and the vehicle length information; and obtaining the information about the obstacle that is higher than the road surface of the road on which the vehicle travels and that hinders the U-turn of the vehicle in the planned U-turn region.

In this manner, the obstacle that hinders the U-turn is determined based on the intersection entry point, the intersection exit point, and the vehicle length information. Therefore, the obstacle that hinders the U-turn can be more reliably determined.

Herein, a polygonal region may be constructed as the planned U-turn region based on the intersection entry point, the intersection exit point, and at least one point obtained based on the vehicle length information. When the intersection entry point is not aligned with the intersection exit point, a point may also be obtained through supplementing the entry lane line or the exit lane line. The planned U-turn region is constructed based on the intersection entry point or the intersection exit point, the point obtained through supplementing, and the at least one point obtained based on the length information.

When the planned U-turn region is constructed based on the point obtained through supplementing, because the point obtained through supplementing is closer to an inner side of the to-be-marked intersection, a projection point of the obstacle is calculated from the point to obtain the farthest projection end. Therefore, a calculation load of calculating the projection point can be reduced, and a time used for automatically marking the U-turn lane line can be reduced.

When the entry lane line or the exit lane line is supplemented based on a spatial location relationship between the intersection entry point and the intersection exit point, and the intersection exit point is closer to the inner side of the to-be-marked intersection than the intersection entry point, the first straight line part includes a part obtained through extending the entry lane line from the intersection entry point to the inner side of the to-be-marked intersection. When the intersection entry point is closer to the inner side of the to-be-marked intersection than the intersection exit point, the second straight line part includes a part obtained through extending the exit lane line from the intersection exit point to the inner side of the to-be-marked intersection. In other words, the first straight line part includes a part obtained through supplementing the entry lane line and a part obtained based on the farthest projection end of the obstacle, or the second straight line part includes a part obtained through supplementing the exit lane line and a part obtained based on the farthest projection end of the obstacle. In this way, a calculation load of marking the U-turn lane line can be reduced, and a time used for automatically marking the U-turn lane line can be reduced.

A second aspect provides an apparatus for automatically marking a U-turn lane line. The apparatus includes: an information obtaining module, where the information obtaining module obtains information about a to-be-marked intersection, where the information about the to-be-marked intersection includes information about an intersection entry point, information about an intersection exit point, and information about an obstacle that is higher than a road surface of a road on which a vehicle travels and that hinders a U-turn of the vehicle at the to-be-marked intersection, the intersection entry point is determined based on an endpoint of an entry lane line of the to-be-marked intersection, and the intersection exit point is determined based on an endpoint of an exit lane line of the to-be-marked intersection; and a marking module, where the marking module marks a U-turn lane line with a first depth, where the first depth is determined based on a second depth of the obstacle, the first depth is a depth at which the U-turn lane line extends from the intersection entry point or the intersection exit point to the to-be-marked intersection, and the second depth is a distance from a farthest projection end of the obstacle on an extension line of the entry lane line to the to-be-marked intersection to the intersection entry point, or the second depth is a distance from a farthest projection end of the obstacle on an extension line of the exit lane line to the to-be-marked intersection to the intersection exit point.

Herein, the first depth may be a distance from a farthest projection end of the U-turn lane line on the extension line of the entry lane line to the to-be-marked intersection to the intersection entry point. Alternatively, the first depth may be a distance from a farthest projection end of the U-turn lane line on the extension line of the exit lane line to the to-be-marked intersection to the intersection exit point.

In this manner, when there is the obstacle, the first depth of the U-turn lane line is determined based on the farthest projection end of the obstacle on the extension line of the entry lane line or the exit lane line. Therefore, in comparison with a case in which there is no obstacle, the U-turn lane line that extends to the to-be-marked intersection at a relatively large depth can be automatically marked, to avoid collision with the obstacle during a U-turn of the vehicle. In this way, the automatically marked U-turn lane line does not need to be manually adjusted, or a time used for manual adjustment can be reduced.

In a possible implementation of the second aspect, the U-turn lane line includes a straight-line part and a curve part; and the first depth includes a straight-line depth of the straight line part and a curve depth of the curve part, and the straight line depth is determined based on the intersection entry point, the intersection exit point, and the farthest projection end of the obstacle.

In this manner, the U-turn lane line includes the straight-line part and the curve part, so that the marked U-turn lane line can better conform to an actual travel track of the vehicle.

In a possible implementation of the second aspect, the straight line part includes a first straight line part with a first straight line depth and a second straight line part with a second straight line depth, the first straight line part extends from the intersection entry point to the to-be-marked intersection, and the second straight line part extends from the intersection exit point to the to-be-marked intersection; and the curve part is connected between the first straight line part and the second straight line part.

In a possible implementation of the second aspect, the first straight line depth is a distance from the farthest projection end of the obstacle on the extension line of the entry lane line to the to-be-marked intersection to the intersection entry point, and the second straight line depth is a distance from the farthest projection end of the obstacle on the extension line of the exit lane line to the to-be-marked intersection to the intersection exit point.

In this manner, the first straight line depth and the second straight line depth are respectively determined based on the farthest projection ends of the obstacle on the extension lines of the entry lane line and the exit lane line to the to-be-marked intersection. Therefore, a more proper straight-line depth in an entry direction and a more proper straight-line depth in an exit direction can be determined, so that the marked U-turn lane line can better conform to an actual travel track of the vehicle.

In a possible implementation of the second aspect, the curve depth is determined based on the farthest projection end of the obstacle on the extension line of the entry lane line to the to-be-marked intersection, the farthest projection end of the obstacle on the extension line of the exit lane line to the to-be-marked intersection, and vehicle length information.

Herein, the farthest projection end of the obstacle on the extension line of the entry lane line to the to-be-marked intersection may be used as a start point of the curve part, and the farthest projection end of the obstacle on the extension line of the exit lane line to the to-be-marked intersection is used as an end point. At least one control point is determined based on the vehicle length information, to determine the curve part and further determine the curve depth. In addition, the curve part may be determined by using a Bézier curve or a spline curve.

In this manner, the curve depth of the curve part is further determined based on the vehicle length information, and a proper U-turn lane line can be marked based on different vehicle types such as a car and a truck, so that the marked U-turn lane line better conforms to an actual travel track of the vehicle.

In a possible implementation of the second aspect, the information obtaining module constructs a planned U-turn region based on the intersection entry point, the intersection exit point, and the vehicle length information; and obtains the information about the obstacle that is higher than the road surface of the road on which the vehicle travels and that hinders the U-turn of the vehicle in the planned U-turn region.

In this manner, the obstacle that hinders the U-turn is determined based on the intersection entry point, the intersection exit point, and the vehicle length information. Therefore, the obstacle that hinders the U-turn can be more reliably determined.

A third aspect provides an apparatus for automatically marking a U-turn lane line. The apparatus includes at least one processor and at least one memory. The memory stores program instructions. When the program instructions are executed by the at least one processor, the at least one processor is enabled to perform any method provided in the first aspect and the possible implementations of the first aspect.

A fourth aspect provides a computer-readable storage medium. The computer-readable storage medium stores program instructions. When the program instructions are executed by a computer, the computer is enabled to perform any method provided in the first aspect and the possible implementations of the first aspect.

A fifth aspect provides a computer program. Through running the program, a computer can perform any method provided in the first aspect and the possible implementations of the first aspect, or play a role of any apparatus provided in the second aspect and the possible implementations of the second aspect.

A sixth aspect provides a map. The map includes a U-turn lane line with a first depth. The first depth is determined based on a second depth of an obstacle that is higher than a road surface of a road on which a vehicle travels and that hinders a U-turn of the vehicle at a U-turn intersection. The first depth is a depth at which the U-turn lane line extends from an intersection entry point or an intersection exit point to the U-turn intersection. The intersection entry point is determined based on an endpoint of an entry lane line of the U-turn intersection. The intersection exit point is determined based on an endpoint of an exit lane line of the U-turn intersection. The second depth is a distance from a farthest projection end of the obstacle on an extension line of the entry lane line to the U-turn intersection to the intersection entry point, or the second depth is a distance from a farthest projection end of the obstacle on an extension line of the exit lane line to the U-turn intersection to the intersection exit point.

In a possible implementation of the sixth aspect, the U-turn lane line includes a straight-line part and a curve part; and the first depth includes a straight-line depth of the straight line part and a curve depth of the curve part, and the straight line depth is determined based on the intersection entry point, the intersection exit point, and the farthest projection end of the obstacle.

In a possible implementation of the sixth aspect, the straight line part includes a first straight line part with a first straight line depth and a second straight line part with a second straight line depth, the first straight line part extends from the intersection entry point to the U-turn intersection, and the second straight line part extends from the intersection exit point to the U-turn intersection; and the curve part is connected between the first straight line part and the second straight line part.

In a possible implementation of the sixth aspect, the first straight line depth is a distance from the farthest projection end of the obstacle on the extension line of the entry lane line to the U-turn intersection to the intersection entry point, and the second straight line depth is a distance from the farthest projection end of the obstacle on the extension line of the exit lane line to the U-turn intersection to the intersection exit point.

In a possible implementation of the sixth aspect, the curve depth is determined based on the farthest projection end of the obstacle on the extension line of the entry lane line to the U-turn intersection, the farthest projection end of the obstacle on the extension line of the exit lane line to the U-turn intersection, and vehicle length information.

In a possible implementation of the sixth aspect, the obstacle is located in a planned U-turn region constructed based on the intersection entry point, the intersection exit point, and the vehicle length information.

According to the sixth aspect and the possible implementations of the sixth aspect, the U-turn lane line included in the map better conforms to an actual travel track of the vehicle, and therefore can more properly provide navigation for the vehicle.

These aspects and other aspects are more concise and easier to understand in descriptions of the following embodiments.

BRIEF DESCRIPTION OF THE DRAWINGS

The following further describes features of this disclosure and a relationship between the features with reference to the accompanying drawings. The accompanying drawings are all examples, and some features are not shown in actual proportions. In addition, in some accompanying drawings, common features that are not mandatory may be omitted. A combination of the features shown in the accompanying drawings is not intended to limit this disclosure. In addition, in this specification, same reference numerals represent same content. The specific accompanying drawings are described as follows.

DESCRIPTION OF REFERENCE NUMERALS

Figure 1:
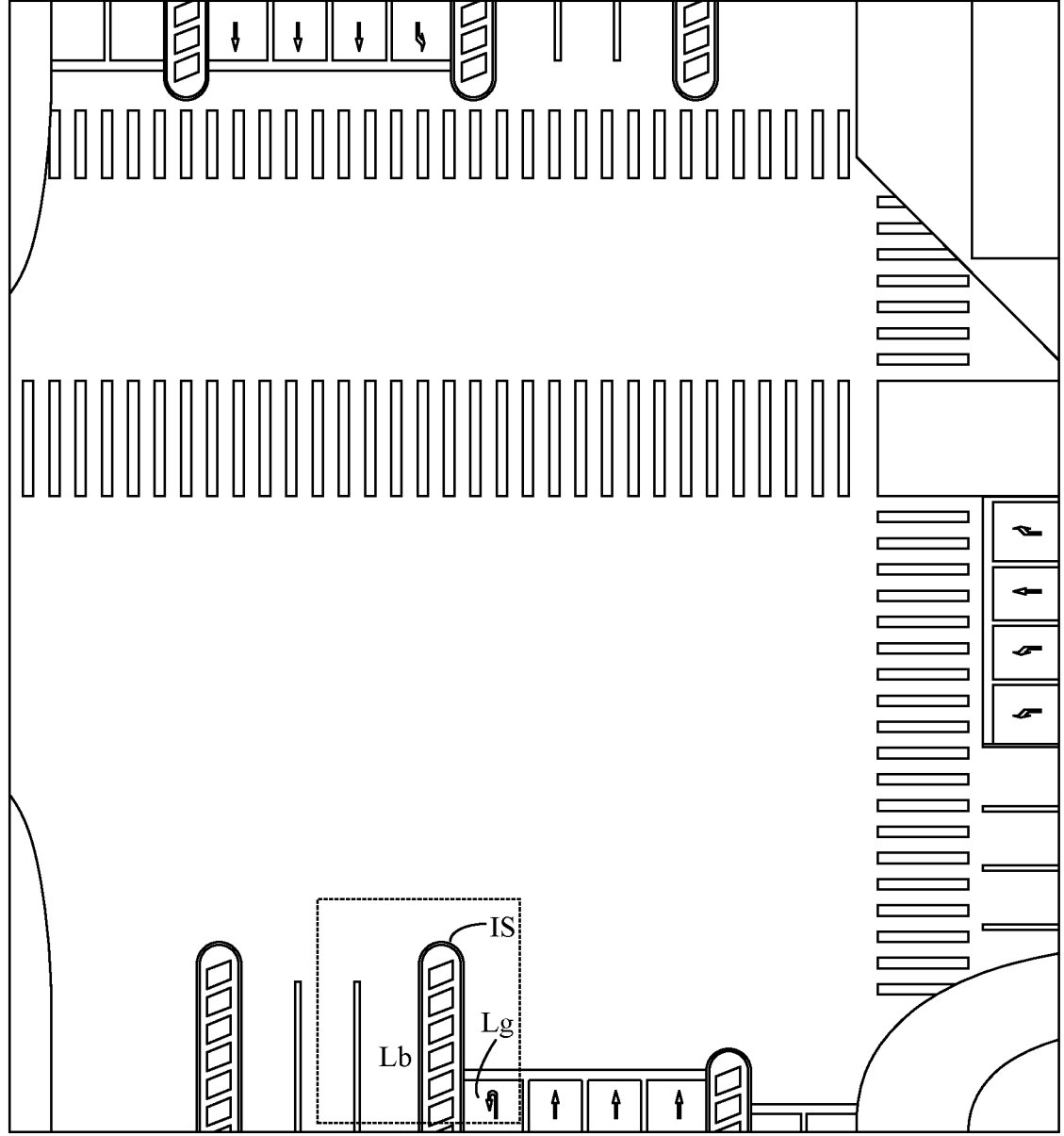
FIG. 1 is a schematic diagram of a method for automatically marking a U-turn lane line according to an embodiment.

100: apparatus for automatically marking a U-turn lane line;
110: information obtaining module;
111: lane line information obtaining unit;
112: lane line supplementing unit;
113: obstacle determining unit;
120: marking module;
121: obstacle depth determining unit;
122: U-turn lane line depth determining unit;
200: computing device;
210: processor;
220: memory;
230: communications interface;
240: bus.

DETAILED DESCRIPTION

In the following description, reference numerals of steps such as S10, S20, . . . , and the like do not necessarily indicate that the steps are performed in this sequence. If permitted, a sequence of the steps may be changed, or the steps may be simultaneously performed.

The term "include" used in this specification and the claims shall not be construed as being limited to the contents listed below, and does not exclude other elements or steps. It should be construed as specifying existence of a mentioned feature, whole, step, or part, but does not preclude existence or addition of one or more other features, wholes, steps, or parts and their groups. Therefore, the expression "a device including apparatuses X and Y" should not be limited to a device including only the apparatuses X and Y.

"One embodiment" or "an embodiment" mentioned in this specification means that a particular feature, structure, or characteristic described in combination with the embodiment is included in at least one embodiment. The phrase "in some embodiments" in this specification does not mean that all the embodiments are the same. Further, in one or more embodiments, the particular features, structures, or properties can be combined in any proper manner, as will be clear from this disclosure to a person of ordinary skill in the art.

Unless otherwise defined, all technical and scientific terms used in this specification have a same meaning as that usually understood by a person skilled in the art. In case of any inconsistency, the meaning described in this specification or the meaning obtained according to the content recorded in this specification shall be used. In addition, the terms used in this specification are merely for the purpose of describing the embodiments, but are not intended to limit this disclosure.

The technology in this disclosure is applied to a high-definition map. The high-definition map may provide geographical coordinate information of each lane on a road. Herein, definition may reach a centimeter level. In an intersection region, the high-definition map also generates a plurality of lane-level virtual lane lines based on an actual road scenario, to provide accurate and smooth navigation information for a vehicle to travel at an intersection. The technology in this disclosure is used to automatically mark a virtual U-turn lane line at a to-be-marked intersection, that is, mark the U-turn lane line on an electronic map.

The following describes the implementations in detail with reference to the accompanying drawings.

1. Method for Automatically Marking a U-Turn Lane Line in a First Implementation The first implementation relates to the method for automatically marking a U-turn lane line, to automatically mark a U-turn lane line at a to-be-marked intersection on an electronic map.

With reference to FIG. 1 to FIG. 11, the method for automatically marking a U-turn lane line in the first implementation is described.

FIG. 1 is a schematic diagram of a method for automatically marking a U-turn lane line according to an embodiment. A region enclosed by a dashed-line box in the lower part of FIG. 1 is a U-turn location of a vehicle at a U-turn intersection, that is, a to-be-marked intersection. The vehicle may make a U-turn from an entry lane Lg to an exit lane Lb. In FIG. 1, the entry lane Lg is not aligned with the exit lane Lb. Specifically, a lane line endpoint (at a location of a stop line) of the entry lane Lg is not aligned with a lane line endpoint of the exit lane Lb. In addition, there is an isolation belt IS between the entry lane Lg and the exit lane Lb.

At the to-be-marked intersection, in addition to the isolation belt IS, there may be another intersection object higher than a road surface of a road on which the vehicle travels. The object becomes an obstacle that affects the U-turn of the vehicle. In other approaches, when a U-turn lane line is automatically marked at such a to-be-marked intersection, an obstacle at a U-turn location is not considered. Even if the U-turn lane line is automatically generated, a map making person still needs to perform manual adjustment. In consideration of the foregoing problem in other approaches, this disclosure provides the following embodiments for automatically marking a virtual U-turn lane line at an intersection that are to be described in detail.

1.1 First Embodiment

Figure 2:
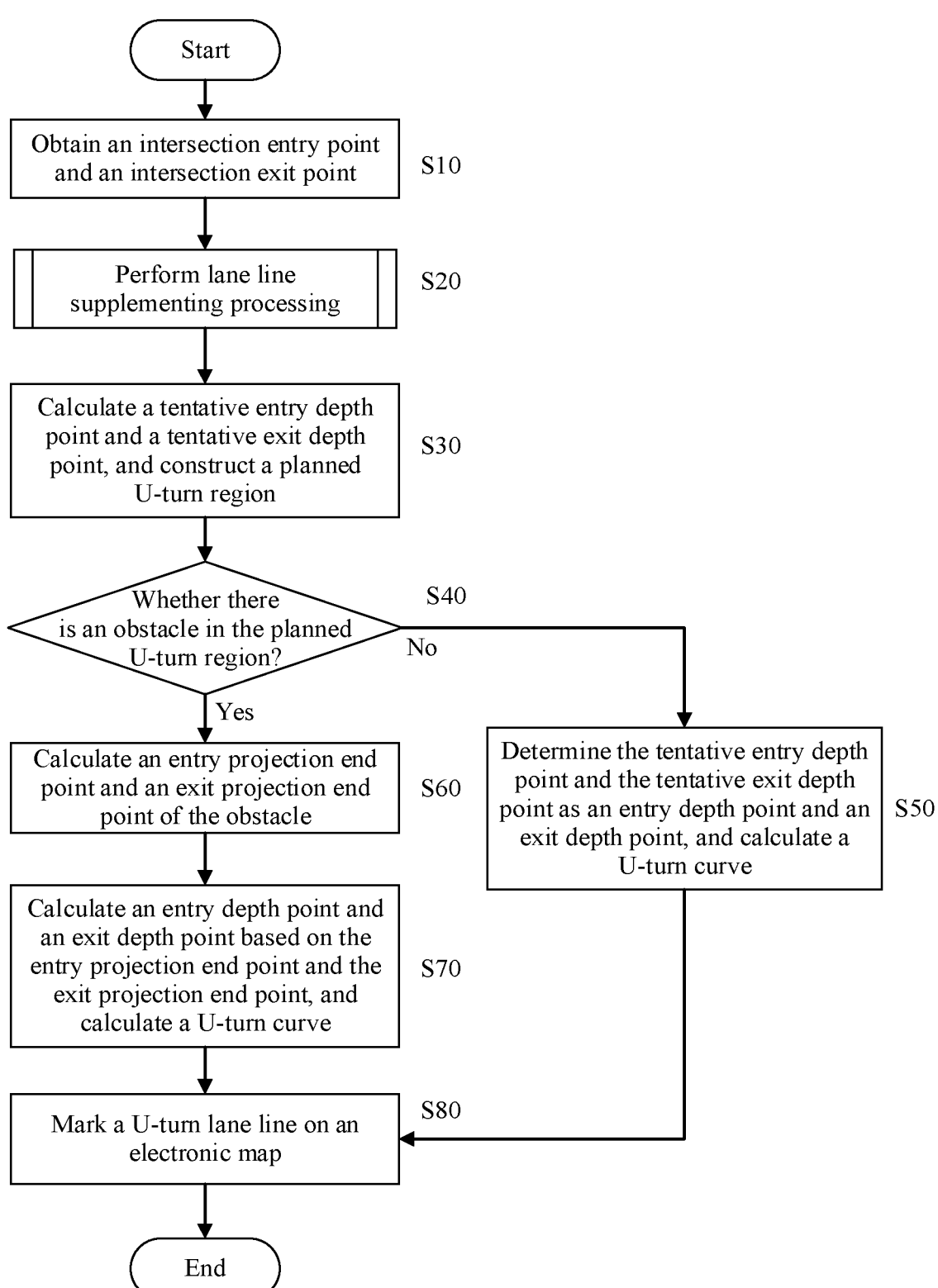
FIG. 2 is a schematic flowchart of a method for automatically marking a U-turn lane line according to an embodiment.
Figure 3:
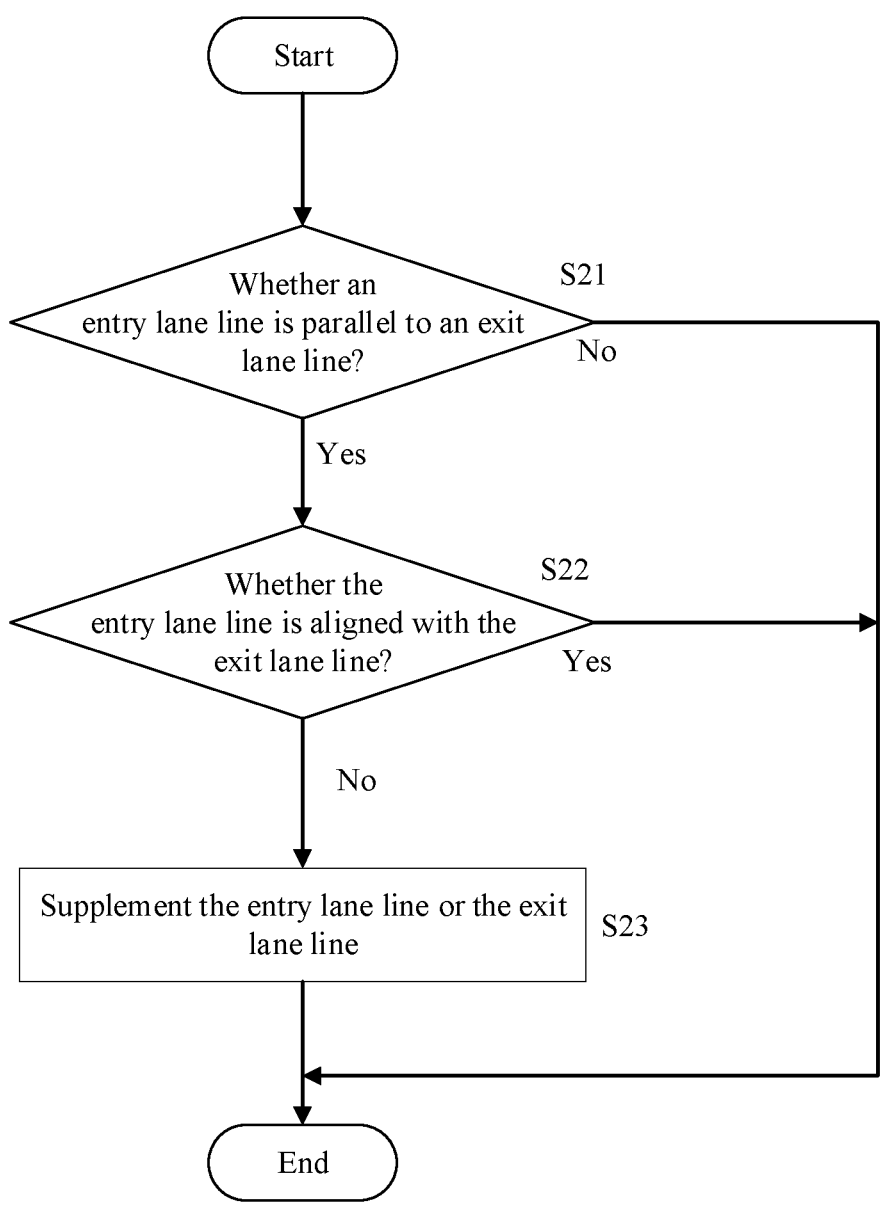
FIG. 3 is a schematic flowchart of a sub-process in FIG. 2.

FIG. 2 is a schematic flowchart of a method for automatically marking a U-turn lane line according to an embodiment. FIG. 3 is a schematic flowchart of a sub-process in FIG. 2. A procedure in this embodiment is executed by an apparatus for automatically marking a U-turn lane line. The apparatus may be implemented in a manner of software, hardware, or a combination of software and hardware. The apparatus may be a part or all of an electronic device. The apparatus for automatically marking a U-turn lane line determines, based on information such as intersection information and U-turn indication sign information near the intersection, a to-be-marked intersection that needs to be marked with a virtual U-turn lane line at the intersection, and performs processing shown in the flowchart in FIG. 2.

Figure 4:
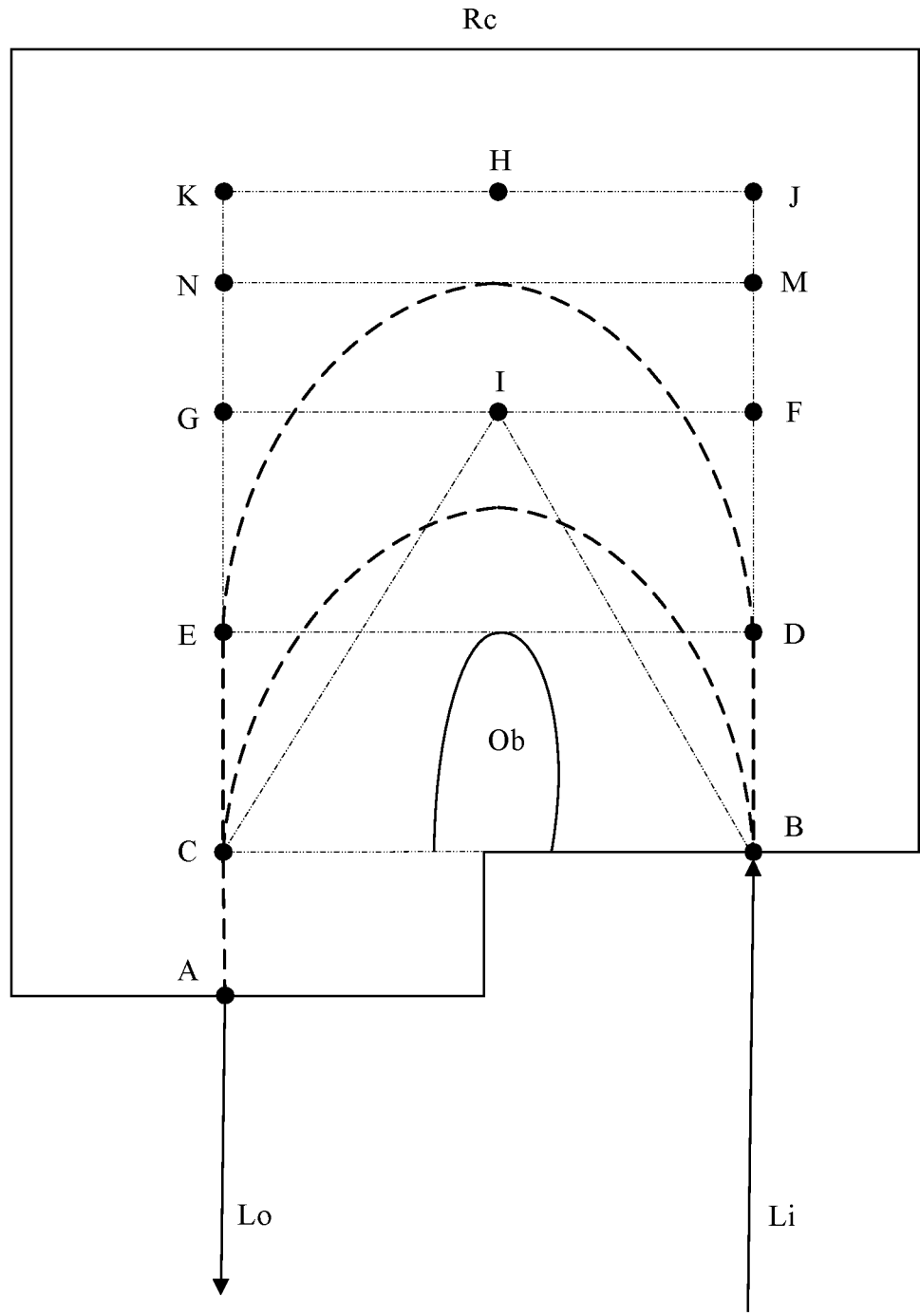
FIG. 4 is a schematic diagram of illustrating a process of calculating a U-turn lane line in a method for automatically marking a U-turn lane line according to an embodiment.

FIG. 4 is a schematic diagram of illustrating a process of calculating a U-turn lane line in a method for automatically marking a U-turn lane line according to an embodiment. In a case of a polygonal intersection region Rc shown in FIG. 4, processing shown in the flowchart shown in FIG. 2 is performed. When there is an obstacle Ob, a U-turn lane line including a line segment BD used as an entry projection line, a curve DE used as a U-turn curve, a line segment CE used as an exit projection line, and a line segment AC used as an exit supplemented line is calculated. When there is no obstacle Ob, a U-turn lane line including a curve BC used as a U-turn curve and a line segment AC used as an exit supplemented line is calculated. With reference to FIG. 2 to FIG. 4, the following describes the method for automatically marking a U-turn lane line provided in the embodiments.

Step S10 to step S40 are steps used to obtain information about a to-be-marked intersection. The information about the to-be-marked intersection includes at least information about an intersection entry point, information about an intersection exit point, and information about an obstacle that is higher than a road surface of a road on which a vehicle travels and that hinders a U-turn of the vehicle at the to-be-marked intersection; and may further include information about an entry lane line, information about an exit lane line, and the like. The information may be directly obtained from an electronic map, or may be generated through processing information in an electronic map.

Step S10: Obtain the intersection entry point and the intersection exit point.

The intersection entry point and the intersection exit point may be an endpoint of the entry lane line and an endpoint of the exit lane line of the to-be-marked intersection in the electronic map that are close to the side of the to-be-marked intersection. Alternatively, a polygonal intersection region may be constructed based on a stop line, an intersection object, and the like at the to-be-marked intersection in the electronic map. An intersection point between a boundary line of the intersection region and the entry lane line is used as the intersection entry point. An intersection point between a boundary line of the intersection region and the exit lane line is used as the intersection exit point. The intersection entry point is used as a start point of the U-turn lane line. The intersection exit point is used as an end point of the U-turn lane line.

The intersection object in the electronic map includes, for example, an object higher than a road surface of a road on which the vehicle travels, for example, an isolation belt, a curbstone, a sidewalk (footpath), and a traffic light facility.

The entry lane line and the exit lane line of the to-be-marked intersection in the electronic map may be a lane center line and/or a lane side line. The U-turn lane line marked in the electronic map is a lane center line and/or a lane side line based on the entry lane line and the exit lane line of the to-be-marked intersection in the electronic map. In the following description, the following case is used as an example: The entry lane line and the exit lane line in the electronic map are lane center lines. However, this disclosure is not limited thereto. Same processing may also be performed for the lane side line.

In a case of FIG. 4, an intersection entry point B and an intersection exit point A are obtained by using step S10. The intersection entry point B and the intersection exit point A are respectively an endpoint of an entry lane line Li and an endpoint of an exit lane line Lo. The intersection entry point B and the intersection exit point A may also be respectively intersection points between a polygon intersection region Rc and each of the entry lane line Li and the exit lane line Lo.

Step S20: Perform lane line supplementing processing. The entry lane line is compared with the exit lane line. Lane line supplementing is performed according to an actual case. FIG. 3 is a schematic flowchart of the lane line supplementing processing in step S20.

Step S21: Determine whether the entry lane line is parallel to the exit lane line. Herein, parallel is not limited to absolute parallel, and also includes roughly parallel. Optionally, when an included angle between the entry lane line and the exit lane line is not greater than a specified angle, it may be considered that the two lane lines are roughly parallel. The specified angle is, for example, 30 degrees.

When the entry lane line is parallel to the exit lane line, step S22 is performed. When the entry lane line is not parallel to the exit lane line, the lane line supplementing is not performed, and the sub-procedure in FIG. 3 ends.

Step S22: Determine whether the entry lane line is aligned with the exit lane line. That the entry lane line is aligned with the exit lane line may be understood as that the endpoint of the entry lane line and the endpoint of the exit lane line that are close to the side of the to-be-marked intersection are aligned in a width direction of the road. In this embodiment, it is determined whether the intersection entry point and the intersection exit point are aligned in the width direction of the road, to determine whether the exit lane line is aligned with the entry lane line.

When the intersection entry point is not aligned with the intersection exit point, that is, when the entry lane line is not aligned with the exit lane line, step S23 is performed. When the intersection entry point is aligned with the intersection exit point, that is, when the entry lane line is aligned with the exit lane line, the lane line does not need to be supplemented, or a supplementing amount is zero. The sub-procedure in FIG. 3 ends.

Step S23: Supplement the entry lane line or the exit lane line. A direction towards the to-be-marked intersection is considered as a front direction. When the intersection entry point is located in front of the intersection exit point, the exit lane line is supplemented to the to-be-marked intersection in a reverse direction of an exit direction. When the intersection exit point is located in front of the intersection entry point, the entry lane line is supplemented to the to-be-marked intersection in an entry direction.

When the entry lane line is supplemented, an entry supplementing point aligned with the intersection exit point is obtained. A line segment that connects the intersection entry point and the entry supplementing point is an entry supplementing line. The entry supplementing line is used as a part of the finally calculated complete U-turn lane line. Optionally, a length of the entry supplementing line may be zero. When the entry supplementing line is zero, the intersection entry point and the entry supplementing point are a same point. In other words, the exit lane line is supplemented, but the entry lane line is not supplemented.

When the exit lane line is supplemented, an exit supplementing point aligned with the intersection entry point is obtained. A line segment that connects the intersection exit point and the exit supplementing point is an exit supplementing line. The exit supplementing line is used as a part of the finally calculated complete U-turn lane line. Optionally, a length of the exit supplementing line may be zero. When the exit supplementing line is zero, the intersection exit point and the exit supplementing point are a same point. In other words, the entry lane line is supplemented, but the exit lane line is not supplemented.

In a case of FIG. 4, it is determined, through the lane line supplementing processing in step S20, that the entry lane line Li is parallel to the exit lane line Lo. The intersection entry point B is located in front of the intersection exit point A. The exit lane line Lo is supplemented to obtain an exit supplementing point C aligned with the intersection entry point B. A line segment AC that connects the intersection exit point A and the exit supplementing point C is the exit supplementing line. In the case in FIG. 4, the intersection entry point B is also used as the entry supplementing point B, and the length of the entry supplementing line is zero.

Step S30: Calculate a tentative entry depth point and a tentative exit depth point, and construct a planned U-turn region.

A polygonal planned U-turn region is constructed based on the entry supplementing point, the exit supplementing point, and U-turn depth information. Herein, the U-turn depth information is pre-specified information about a U-turn depth of the vehicle (the U-turn depth information herein may also be referred to as specified U-turn depth information). The U-turn depth may be understood as an approximate entry distance (or an entry depth) in a direction of the entry lane line (that is, a direction of the U-turn depth) towards the intersection when the vehicle makes a U-turn, that is, when there is no obstacle. For example, the U-turn depth may be specified based on vehicle length information. For example, the U-turn depth may be 6 meters to 8 meters. The following curve depth is related to the U-turn depth information.

A point, on an extension line of the entry lane line extending to the to-be-marked intersection, whose distance to the entry supplementing point is equal to the U-turn depth is calculated based on the entry supplementing point and the U-turn depth. The point is used as the tentative entry depth point. A point, on an extension line of the exit lane line extending to the to-be-marked intersection, whose distance to the exit supplementing point is equal to the U-turn depth is calculated based on the exit supplementing point and the U-turn depth. The point is used as the tentative exit depth point.

A quadrilateral region obtained through sequentially connecting the entry supplementing point, the tentative entry depth point, the tentative exit depth point, and the exit supplementing point may be used as the planned U-turn region. Alternatively, a triangular region obtained through connecting the entry supplementing point, the exit supplementing point, and a midpoint of a line segment that connects the tentative entry depth point and the tentative exit depth point may be used as the planned U-turn region.

Optionally, the midpoint may be not used. Instead, a point, on the line segment that connects the tentative entry depth point and the tentative exit depth point, whose distance to the midpoint is within a specified range is used. Optionally, the planned U-turn region may alternatively be a polygon other than a triangle and a quadrilateral.

In the case of FIG. 4, in step S30, the tentative entry depth point F and the tentative exit depth point G are calculated. A region shown in a quadrilateral BFGC is obtained and used as the planned U-turn region, or a region shown in a triangle BIC is obtained and used as the planned U-turn region. Herein, I is a midpoint of a line segment FG.

Step S40: Determine whether there is an obstacle that is higher than the road surface of the road on which the vehicle travels and that hinders the U-turn of the vehicle in the planned U-turn region.

Based on a spatial location relationship between the planned U-turn region and the intersection object, it is determined whether the intersection object includes the obstacle that is higher than the road surface of the road on which the vehicle travels and that hinders the U-turn of the vehicle. For example, it may be determined that an intersection object that at least partially overlaps the planned U-turn region and that is higher than the road surface of the road on which the vehicle travels is considered as an obstacle. The obstacle is, for example, an isolation belt disposed on the road. If there is no obstacle in the planned U-turn region, step S50 is performed. If there is an obstacle in the planned U-turn region, step S60 is performed.

Step S50 is used to calculate a U-turn curve when there is no obstacle.

Step S50: Determine the tentative entry depth point and the tentative exit depth point as the entry depth point and the exit depth point, and calculate the U-turn curve based on the entry supplementing point, the exit supplementing point, the entry depth point, and the exit depth point.

When there is no obstacle in the planned U-turn region, for the entry U-turn depth in an entry direction, a start point is the entry supplementing point, and an end point is the entry depth point; and for the exit U-turn depth in the reverse direction of the exit direction, a start point is the exit supplementing point, and an end point is the exit depth point.

The U-turn curve may be calculated based on the entry supplementing point, the entry depth point, the exit supplementing point, and the exit depth point. Optionally, the U-turn curve may be alternatively calculated based on the entry supplementing point, the midpoint of the line segment that connects the entry depth point and the exit depth point, and the exit supplementing point. Optionally, the midpoint may be not used. Instead, a point, on a line segment that connects the entry depth point and the exit depth point, whose distance to the midpoint is within a specified range is used.

When there is no obstacle in the planned U-turn region, a start point of the U-turn curve is the entry supplementing point, and an end point is the exit supplementing point. The calculated U-turn curve is used as a part or all of the finally calculated complete U-turn lane line. In this way, when there is no obstacle in the planned U-turn region, the complete U-turn lane line includes three parts: the entry supplementing line, the U-turn curve, and the exit supplementing line; and includes at least the U-turn curve.

In addition, when the U-turn curve is calculated, a Bézier curve may be used, or a spline curve may be used. A specific curve calculation tool is not limited in this disclosure.

In the case of FIG. 4, when there is no obstacle in the region shown in the quadrilateral BFGC or the region shown in the triangle BIC as the planned U-turn region, the entry depth point F and the exit depth point G are obtained through step S50 when there is no obstacle. The curve BC used as the U-turn curve when there is no obstacle is calculated by using the entry supplementing point B as a start point, the exit supplementing point C as an end point, and the entry depth point F and the exit depth point G as control points. In addition, the U-turn curve when there is no obstacle may be alternatively calculated by using the midpoint I of the line segment FG as a control point.

Steps S60 and S70 are used to calculate the U-turn curve when there is an obstacle. A U-turn lane line depth of the U-turn lane line when there is an obstacle can be determined through steps S60 and S70. The U-turn lane line depth is described in detail below.

When there is an obstacle, the start point and the end point of the U-turn curve are determined based on the depth of the obstacle extending along the entry lane line or the exit lane line to the to-be-marked intersection. In this embodiment, the start point and the end point of the U-turn curve are determined through calculating a projection point of the obstacle.

Step S60: Calculate an entry projection end point and an exit projection end point of the obstacle. All projection points of all points of the obstacle in two-dimensional space to the entry lane line, the exit lane line, or the extension line of the entry lane line or the exit lane line extending to the to-be-marked intersection are calculated. The entry projection end point and the exit projection end point are selected from all the projection points. Alternatively, all projection points of all points of the obstacle in three-dimensional or multi-dimensional space to the entry lane line, the exit lane line, or the extension line may be calculated.

A projection point of a point of the obstacle to the entry lane line or the extension line of the entry lane line extending to the to-be-marked intersection is referred to as the entry projection point. The entry projection end point is an entry projection point at a farthest distance to the entry supplementing point among all entry projection points. A line segment that connects the entry supplementing point and the entry projection end point is an entry projection line. The entry projection line is used as a part of the finally calculated complete U-turn lane line. In addition, the entry projection end point is equivalent to a farthest projection end of the obstacle on the extension line of the entry lane line to the to-be-marked intersection.

In this embodiment, the calculated entry projection line is used to extend the U-turn lane line in a direction of the entry lane line in comparison with a case in which there is no obstacle.

A projection point of a point of the obstacle to the exit lane line or the extension line of the exit lane line extending to the to-be-marked intersection is referred to as the exit projection point. The exit projection end point is an exit projection point at a farthest distance to the exit supplementing point among all exit projection points. A line segment that connects the exit supplementing point and the exit projection end point is an exit projection line. The exit projection line is used as a part of the finally calculated complete U-turn lane line. In addition, the exit projection end point is equivalent to a farthest projection end of the obstacle on the extension line of the exit lane line to the to-be-marked intersection.

In this embodiment, the calculated exit projection line is used to extend the U-turn lane line in a direction of the exit lane line in comparison with a case in which there is no obstacle.

Optionally, the entry projection end point may be not selected, and an entry projection point whose distance to the entry projection end point is within a specified range is selected, to obtain the entry projection line.

Optionally, the exit projection end point may be not selected, and an exit projection point whose distance to the exit projection end point is within a specified range is selected, to obtain the exit projection line.

In the case of FIG. 4, when there is the obstacle Ob in the region shown in the quadrilateral BFGC or the region shown in the triangle BIC as the planned U-turn region, an entry projection end point D, an exit projection end point E, the line segment BD used as the entry projection line, and the line segment CE used as the exit projection line are obtained for the obstacle Ob through performing step S50.

Step S70: Calculate the entry depth point and the exit depth point based on the entry projection end point and the exit projection end point, and calculate the U-turn curve based on the entry projection end point, the exit projection end point, the entry depth point, and the exit depth point.

A point, on an extension line of the entry projection line extending to the to-be-marked intersection, whose distance to the entry projection end point is equal to the U-turn depth is calculated based on the entry projection end point and the U-turn depth. The point is used as the entry depth point. A point, on an extension line of the exit lane line extending to the to-be-marked intersection, whose distance to the exit projection end point is equal to the U-turn depth is calculated based on the exit projection end point and the U-turn depth. The point is used as the exit depth point.

Optionally, the entry depth point may be alternatively calculated based on an entry projection point whose distance to the entry projection end point is within a specified range, instead of the entry projection end point. Optionally, the exit depth point may be alternatively calculated based on an exit projection point whose distance to the exit projection end point is within a specified range, instead of the exit projection end point. In addition, the entry depth point and the exit depth point may be further calculated based on a point farther than the entry projection end point and the exit projection end point, so that the calculated lane line more reliably avoids interference with the obstacle.

When there is an obstacle in the planned U-turn region, for the entry U-turn depth in the entry direction, a start point is the entry projection end point, and an end point is the entry depth point; and for the exit U-turn depth in the reverse direction of the exit direction, a start point is the exit projection end point, and an end point is the exit depth point.

The U-turn curve may be calculated based on the entry projection end point, the entry depth point, the exit depth point, and the exit projection end point. Optionally, the U-turn curve may be alternatively calculated based on the entry projection end point, the midpoint of the line segment that connects the entry depth point and the exit depth point, and the exit projection end point. Optionally, the midpoint may be not used. Instead, a point, on a line segment that connects the entry depth point and the exit depth point, whose distance to the midpoint is within a specified range is used.

When there is an obstacle in the planned U-turn region, the start point of the U-turn curve is the entry projection end point, and the end point is the exit projection end point. When there is an obstacle in the planned U-turn region, the complete U-turn lane line includes five parts: the entry supplementing line, the entry projection line, the U-turn curve, the exit projection line, and the exit supplementing line; and includes at least the entry projection line, the U-turn curve, and the exit projection line.

In the case of FIG. 4, the entry depth point J and the exit depth point K when there is an obstacle are obtained by using step S70. The curve DE used as the U-turn curve when there is an obstacle is calculated by using the entry projection end point D as a start point, the exit projection end point E as an end point, and the entry depth point J and the exit depth point K as control points. Optionally, the U-turn curve when there is an obstacle may be alternatively calculated by using a midpoint H of a line segment JK as a control point.

In addition, in the foregoing description, in addition to the entry supplementing line and the exit supplementing line (for example, a line segment AC in FIG. 4), the U-turn lane line calculated when there is an obstacle includes both a straight-line part (for example, the line segments BD and CE in FIG. 4) and a curve part (for example, the curve DE between the point D and the point E in FIG. 4). However, in another embodiment, alternatively, these straight-line parts may be replaced with curves. For example, the points in FIG. 4 are used as an example. When the U-turn curve is calculated, the U-turn curve when there is an obstacle is calculated by using the entry supplementing point B as a start point, the exit supplementing point C as an end point, and the entry depth point J and the exit depth point K as control points.

Step S80: Mark the calculated U-turn lane line on the electronic map. The U-turn lane line that includes at least the U-turn curve is drawn on the electronic map based on the U-turn curve calculated in step S50. Alternatively, the U-turn lane line that includes at least the entry projection line, the U-turn curve, and the exit projection line is drawn on the electronic map based on the U-turn curve calculated in step S70.

In the case of FIG. 4, in step S80, when there is no obstacle, the U-turn lane line including the curve BC used as the U-turn curve and the line segment AC used as the exit supplementing line is marked; or when there is an obstacle, the U-turn lane line including the line segment BD used as the entry projection line, the curve DE used as the U-turn curve, the line segment CE used as the exit projection line, and the line segment AC used as the exit supplementing line is marked.

The U-turn lane line marked in step S80 has the U-turn lane line depth. The U-turn lane line depth is a depth at which the U-turn lane line extends from the intersection entry point or the intersection exit point to the to-be-marked intersection. When there is an obstacle that hinders the U-turn of the vehicle, the U-turn lane line depth is determined based on a depth at which the obstacle extends to the to-be-marked intersection. The U-turn lane line depth is equivalent to a first depth.

According to the foregoing description, the obstacle depth may be understood as a distance from the farthest projection end of the obstacle on the extension line of the entry lane line to the to-be-marked intersection to the intersection entry point, or a distance from the farthest projection end of the obstacle on the extension line of the exit lane line to the to-be-marked intersection to the intersection exit point. The obstacle depth is equivalent to a second depth.

In addition, the U-turn lane line depth may be understood as a distance from the farthest projection end of the U-turn lane line on the extension line of the entry lane line to the to-be-marked intersection to the intersection entry point, or a distance from the farthest projection end of the U-turn lane line on the extension line of the exit lane line to the to-be-marked intersection to the intersection exit point.

In addition, the foregoing merely uses a concept of the farthest projection end to describe the obstacle depth and the U-turn lane line depth in a geometric relationship. Actually, the foregoing farthest projection end does not need to be calculated.

In the case of FIG. 4, the obstacle depth of the obstacle Ob is, for example, a length of the line segment BD between the intersection entry point B and the entry projection end point D. When there is the obstacle OB, the U-turn lane line depth of the U-turn lane line including a straight-line segment AE, the straight line segment BD, and the curve DE is, for example, a distance from the farthest projection end N of the U-turn lane line on the extension line of the exit lane line Lo to the to-be-marked intersection to the intersection exit point A, that is, a length of a line segment AN.

In addition, the U-turn lane line marked in step S80 when there is an obstacle includes an entry-side straight line part, a curve part, and an exit-side straight line part. The entry-side straight line part includes the entry supplementing line and the entry projection line. The exit-side straight line part includes the exit supplementing line and the exit projection line. The curve part includes the U-turn curve. The entry-side straight line part and the exit-side straight line part are equivalent to the straight-line part. The entry-side straight line part is equivalent to a first straight line part. The exit-side straight line part is equivalent to a second straight line part.

The entry-side straight line part has an entry-side straight line depth. The entry-side straight line depth is the distance from the farthest projection end of the obstacle on the extension line of the entry lane line to the to-be-marked intersection to the intersection entry point. The exit-side straight line part has an exit-side straight line depth. The exit-side straight line depth is the distance from the farthest projection end of the obstacle on the extension line of the exit lane line to the to-be-marked intersection to the intersection exit point. The entry-side straight line depth is equivalent to a first straight line depth. The exit-side straight line depth is equivalent to a second straight line depth.

In the case of FIG. 4, the entry-side straight line part is the line segment DB, the entry-side straight line depth is a length of the line segment DB, the exit-side straight line part is the line segment AE, and the exit-side straight line depth is a length of the line segment AE.

The curve part of the U-turn lane line when there is an obstacle has the curve depth. The curve depth may be understood as a distance from a farthest projection end of the U-turn curve on the extension line of the entry lane line to the to-be-marked intersection to the start point of the U-turn curve, or a distance from a farthest projection end of the U-turn curve on the extension line of the exit lane line to the to-be-marked intersection to the end point of the U-turn curve.

In the case of FIG. 4, the U-turn curve included in the U-turn lane line is the curve DE, the start point of the U-turn curve is the point D, the end point is the point E, the farthest projection end of the curve DE on the extension line of the entry lane line Li is a point M, and the farthest projection end of the curve DE on the extension line of the exit lane line Lo is a point N. Therefore, the curve depth is a length of a line segment DM or a length of a line segment EN.

The foregoing describes a procedure of the method for automatically marking a U-turn lane line provided in the embodiments. However, the steps in the foregoing procedure are not limited to the foregoing sequence, and may be properly adjusted, or some steps may be omitted.

1.2 Second Embodiment

Figure 5:
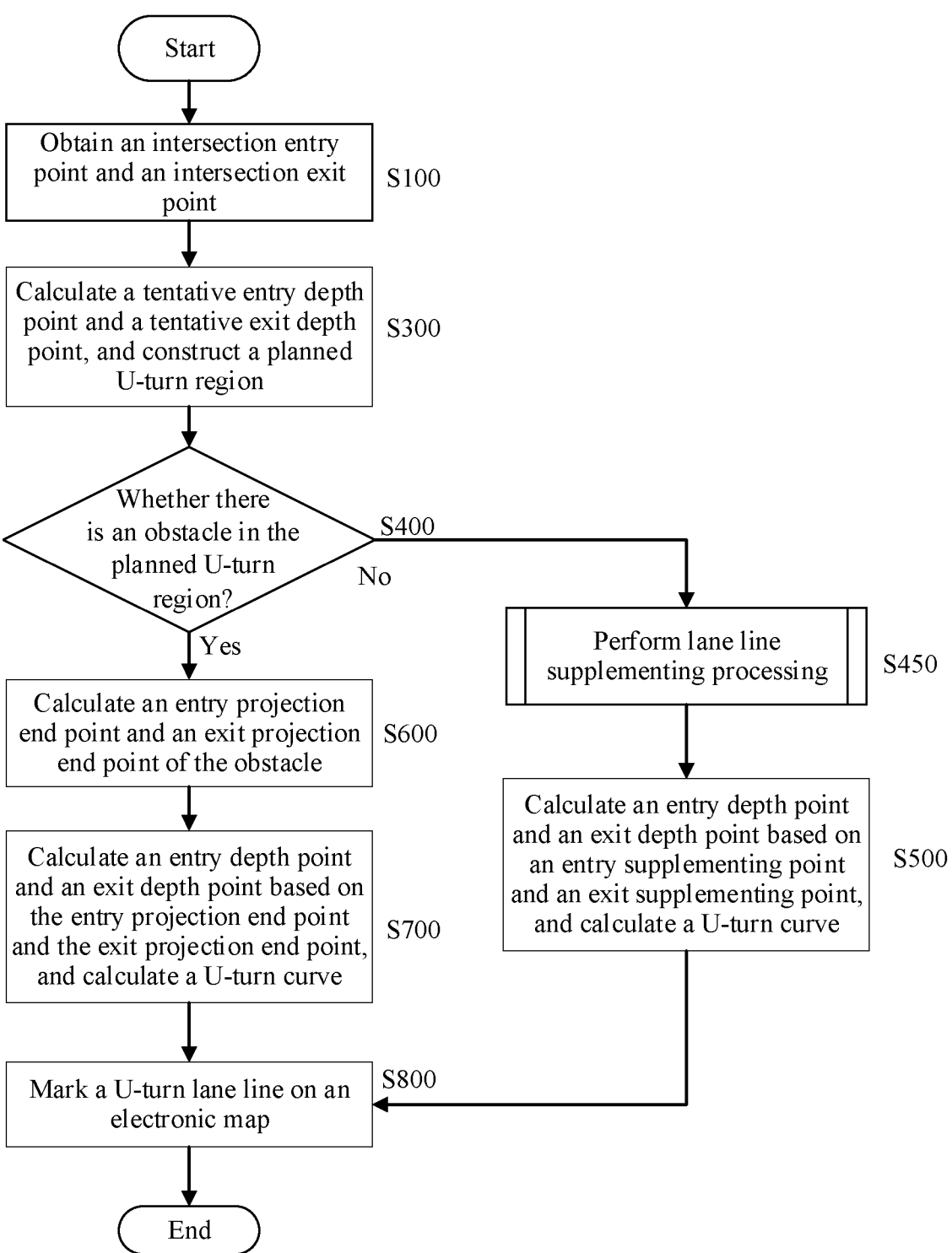
FIG. 5 is a schematic flowchart of a method for automatically marking a U-turn lane line according to an embodiment.

The following describes the second embodiment of this implementation with reference to FIG. 5.

A difference between the second embodiment and the first embodiment is that whether there is an obstacle in a planned U-turn region is determined before lane line supplementing processing is performed. In the following description, same processing in the second embodiment as the first embodiment is described with reference to content in the first embodiment, or is merely briefly described.

FIG. 5 is a schematic flowchart of a method for automatically marking a U-turn lane line according to the second embodiment.

Steps S100, S300, and S400 are steps used to obtain information about a to-be-marked intersection.

Step S100: Obtain an intersection entry point and an intersection exit point. The processing in step S100 is the same as the processing in step S10 in FIG. 2 in the first embodiment. Detailed description is omitted herein.

Step S300: Calculate a tentative entry depth point and a tentative exit depth point, and construct a planned U-turn region.

In this step, the planned U-turn region is constructed based on the intersection entry point, the intersection exit point, and U-turn depth information. The tentative entry depth point is calculated based on the intersection entry point and a U-turn depth. The tentative exit depth point is calculated based on the intersection exit point and the U-turn depth. A polygonal region is obtained based on the intersection entry point, the intersection exit point, the tentative entry depth point, and the tentative exit depth point; and used as the planned U-turn region.

Step S400: Determine whether there is an obstacle in the planned U-turn region. The processing in step S400 is the same as the processing in step S40 in FIG. 2 in the first embodiment. Detailed description is omitted herein. If there is no obstacle, step S450 is performed. If there is an obstacle, step S600 is performed.

Step S450: Perform lane line supplementing processing. The processing in step S450 is the same as the processing in step S20 in FIG. 2 in the first embodiment. Detailed description is omitted herein.

Step S500: Calculate an entry depth point and an exit depth point based on an entry supplementing point and an exit supplementing point, and calculate a U-turn curve based on the entry supplementing point, the exit supplementing point, the entry depth point, and the exit depth point.

Step S600: Calculate an entry projection end point and an exit projection end point of the obstacle.

A line segment that connects the intersection entry point and the entry projection end point is an entry projection line. A line segment that connects the intersection exit point and the exit projection end point is an exit projection line.

Optionally, the entry projection end point may be not selected, and another entry projection point is selected, to obtain the entry projection line. Optionally, the exit projection end point may be not selected, and another exit projection point is selected, to obtain the exit projection line.

Step S700: Calculate the entry depth point and the exit depth point based on the entry projection end point and the exit projection end point, and calculate the U-turn curve based on the entry projection end point, the exit projection end point, the entry depth point, and the exit depth point.

When there is an obstacle in the planned U-turn region, the complete U-turn lane line includes the entry projection line, the U-turn curve, and the exit projection line.

Step S800: Mark the calculated U-turn lane line on an electronic map. The U-turn lane line that includes at least the U-turn curve is drawn on the electronic map based on the U-turn curve calculated in step S500. Alternatively, the U-turn lane line that includes the entry projection line, the U-turn curve, and the exit projection line is drawn on the electronic map based on the U-turn curve calculated in step S700.

1.3 Third Embodiment

Figure 6:
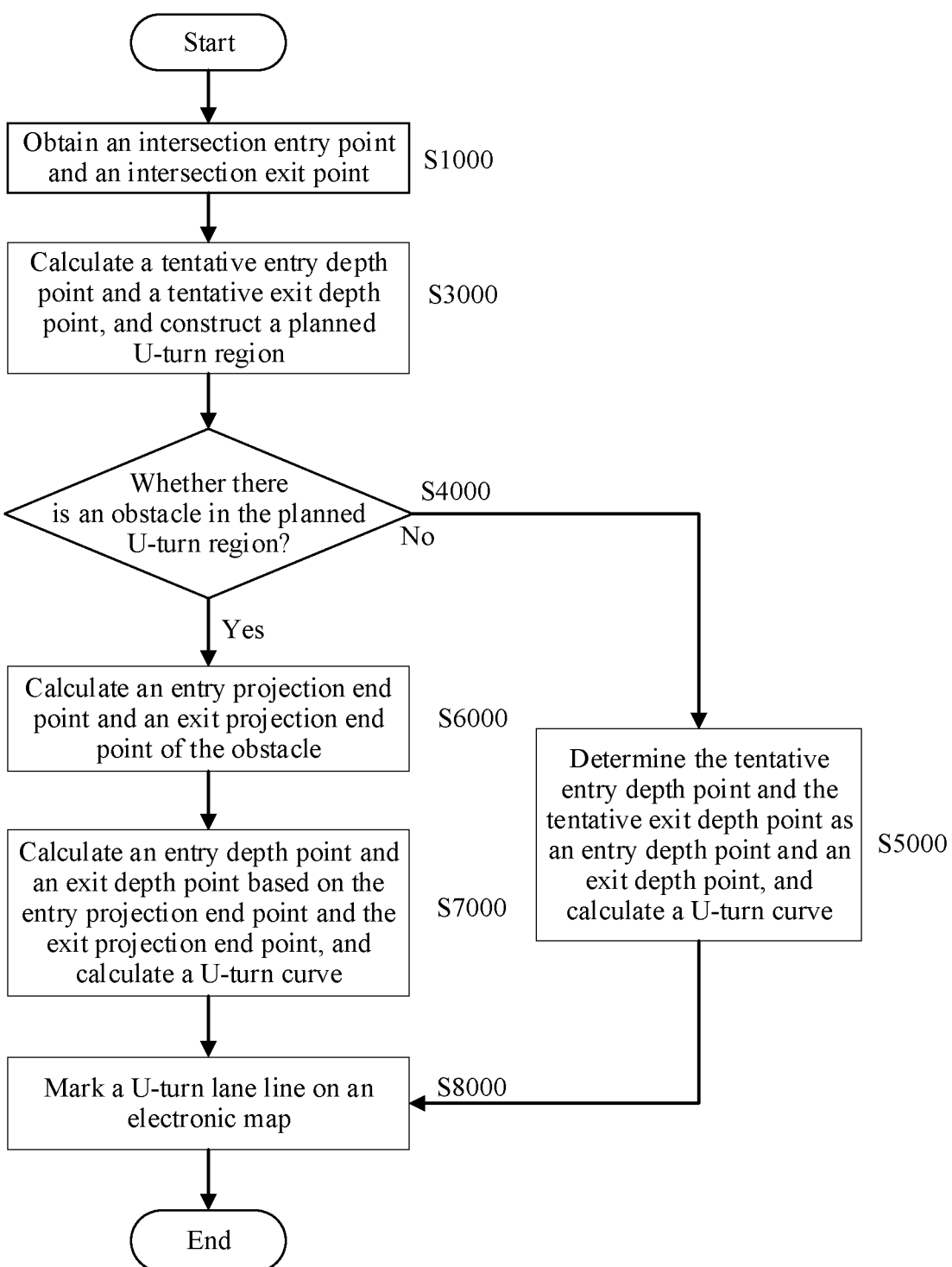
FIG. 6 is a schematic flowchart of a method for automatically marking a U-turn lane line according to an embodiment.

The following describes the third embodiment of this implementation with reference to FIG. 6.

A difference between the third embodiment and the second embodiment is that lane line supplementing processing is omitted. In the following description, same processing in the third embodiment as the second embodiment is described with reference to content in the second embodiment, or is merely briefly described.

FIG. 6 is a schematic flowchart of a method for automatically marking a U-turn lane line according to the third embodiment.

Processing in steps S1000, S3000, S4000, S6000, and S7000 is the same as the processing in steps S100, S300, S400, S600, and S700 in FIG. 5 in the second embodiment. Detailed description is omitted herein.

When there is no obstacle, step S4000 is skipped, and step S5000 is directly performed.

Step S5000: Determine a tentative entry depth point and a tentative exit depth point as an entry depth point and an exit depth point, and calculate a U-turn curve based on an intersection entry point, an intersection exit point, an entry depth point, and an exit depth point.

When there is no obstacle in a planned U-turn region, for an entry U-turn depth in an entry direction, a start point is the intersection entry point, and an end point is the entry depth point; and for an exit U-turn depth in a reverse direction of an exit direction, a start point is the intersection exit point, and an end point is the exit depth point.

The U-turn curve may be calculated based on the intersection entry point, the entry depth point, the exit depth point, and the intersection exit point. Optionally, the U-turn curve may be alternatively calculated based on the intersection entry point, a midpoint of a line segment that connects the entry depth point and the exit depth point, and the intersection exit point. Optionally, the midpoint may be not used. Instead, a point, on a line segment that connects the entry depth point and the exit depth point, whose distance to the midpoint is within a specified range is used.

When there is no obstacle in the planned U-turn region, a start point of the U-turn curve is the intersection entry point, and an end point is the intersection exit point. Therefore, a complete U-turn lane line includes merely the U-turn curve.

Step S8000: Mark the calculated U-turn lane line on an electronic map. The U-turn lane line that includes merely the U-turn curve is drawn on the electronic map based on the U-turn curve calculated in step S5000. Alternatively, the U-turn lane line that includes an entry projection line, the U-turn curve, and an exit projection line is drawn on the electronic map based on the U-turn curve calculated in step S7000.

The foregoing describes some embodiments. However, this disclosure is not limited to the foregoing embodiments.

1.4 Other Embodiments

In some embodiments, the processing shown in the flowchart in FIG. 2 may be performed when a distance between an entry lane line and an exit lane line is greater than a specified threshold. The specified threshold is, for example, four meters.

In some embodiments, a tentative U-turn curve may be first calculated based on an intersection entry point and an intersection exit point. It is determined whether the tentative U-turn curve interferes with an obstacle. If the tentative U-turn curve does not interfere with the obstacle, the tentative U-turn curve is used as a U-turn curve. If the tentative U-turn curve interferes with the obstacle, a U-turn curve is recalculated based on a depth at which the obstacle extends along an entry lane line or an exit lane line to a to-be-marked intersection.

In some embodiments, a U-turn lane line may be marked based on the intersection entry point, the intersection exit point, and preset specified extension amounts. Optionally, when it is determined that there is an obstacle in a planned U-turn region, the entry lane line extends from the intersection entry point to the intersection by a preset specified extension amount to obtain an entry extension point, and the exit lane line extends from the intersection exit point to the intersection by a preset specified extension amount to generate a tentative U-turn lane line. It is determined whether the tentative U-turn lane line interferes with the obstacle. If the tentative U-turn lane line does not interfere with the obstacle, the tentative U-turn lane line is used as the U-turn lane line. If the tentative U-turn lane line interferes with the obstacle, the U-turn lane line is recalculated in the manner described above. Optionally, the specified extension amount may be set based on a type of the obstacle.

In some embodiments, when the entry lane line and the exit lane line are asymmetric with respect to the obstacle, a point, located in front of the obstacle, on a line segment that connects an entry depth point and an exit depth point may be selected as a control point for calculating the U-turn curve.

A case in which the entry lane line and the exit lane line are asymmetric with respect to the obstacle is, for example, that a distance from the obstacle to the entry lane line is not equal to a distance from the obstacle to the exit lane line. Optionally, all projection points of the obstacle on the line segment that connects the entry depth point and the exit depth point may be calculated, and a control point is selected from these projection points. Optionally, a midpoint of the obstacle in a direction perpendicular to the entry lane line or the exit lane line may be calculated. An intersection point between a line that is led out from the midpoint and that is parallel to the entry lane line or the exit lane line, and the line segment that connects the entry depth point and the exit depth point is used as the control point.

In some embodiments, when an included angle between the entry lane line and the exit lane line is greater than a specified angle, an intersection point of extension lines of the entry lane line and the exit lane line may be used as a control point for calculating the U-turn curve.

In some embodiments, an automatically marked U-turn lane line in a U-turn intersection may include two lane side lines and one lane center line.

In some embodiments, when a distance between the entry lane line and the exit lane line is excessively small, only one lane center line and one lane side line on an outer side may be marked for the U-turn lane line, and a lane side line on an inner side may be not marked.

With reference to FIG. 7 to FIG. 11, the following describes examples of a method for automatically marking a U-turn lane line provided in the embodiments.

Figure 7:
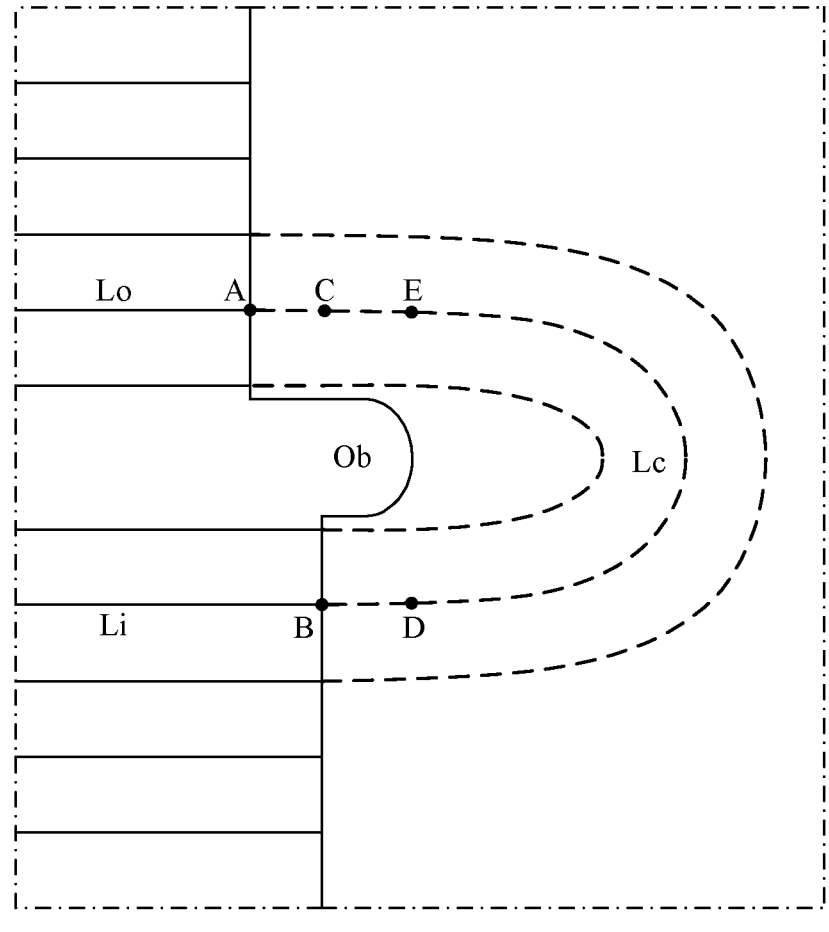
FIG. 7 is a schematic diagram of a method for automatically marking a U-turn lane line according to an embodiment.

FIG. 7 is a schematic diagram of a method for automatically marking a U-turn lane line according to an embodiment. In a scenario in FIG. 7, an entry lane line Li and an exit lane line Lo at a U-turn location of a U-turn intersection are lane center lines. The two lane lines are not aligned. There is an obstacle Ob at the U-turn location. In this scenario, an intersection entry point is B, an intersection exit point is A, the exit lane line Lo is supplemented to a point C, an exit supplementing point is C, an exit supplementing line is a line segment AC, an entry projection end point of the obstacle Ob is D, an exit projection end point is E, an entry projection line is a line segment BD, and an exit projection line is a line segment CE. A U-turn lane line Lc marked on an electronic map is a lane center line, and includes the line segment BD used as the entry projection line, a curve DE used as a U-turn curve, the line segment CE used as the exit projection line, and the line segment AC used as the exit supplementing line. In addition, in FIG. 5, two lane side lines at the U-turn location are also marked. The lane side line at the U-turn location may be obtained through performing the same processing as the lane center line.

Figure 8:
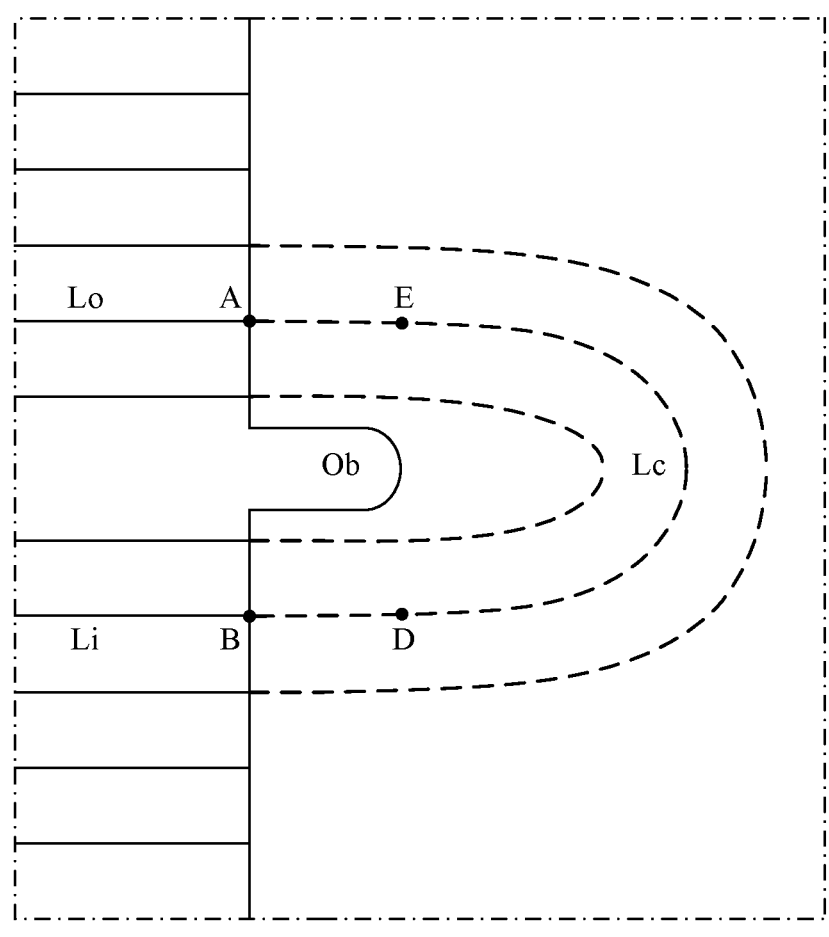
FIG. 8 is a schematic diagram of a method for automatically marking a U-turn lane line according to an embodiment.

FIG. 8 is a schematic diagram of a method for automatically marking a U-turn lane line according to an embodiment. In a scenario in FIG. 8, an entry lane line Li and an exit lane line Lo are lane center lines. The two lane lines are aligned. There is an obstacle Ob at a U-turn location. In this scenario, an intersection entry point is B, an intersection exit point is A, an entry projection end point of the obstacle Ob is D, an exit projection end point is E, an entry projection line is a line segment BD, and an exit projection line is a line segment AE. A U-turn lane line Lc marked on an electronic map is a lane center line, and includes the line segment BD used as the entry projection line, a curve DE used as a U-turn curve, and the line segment AE used as the exit projection line. In addition, in FIG. 8, two lane side lines at the U-turn location are also marked.

Figure 9:
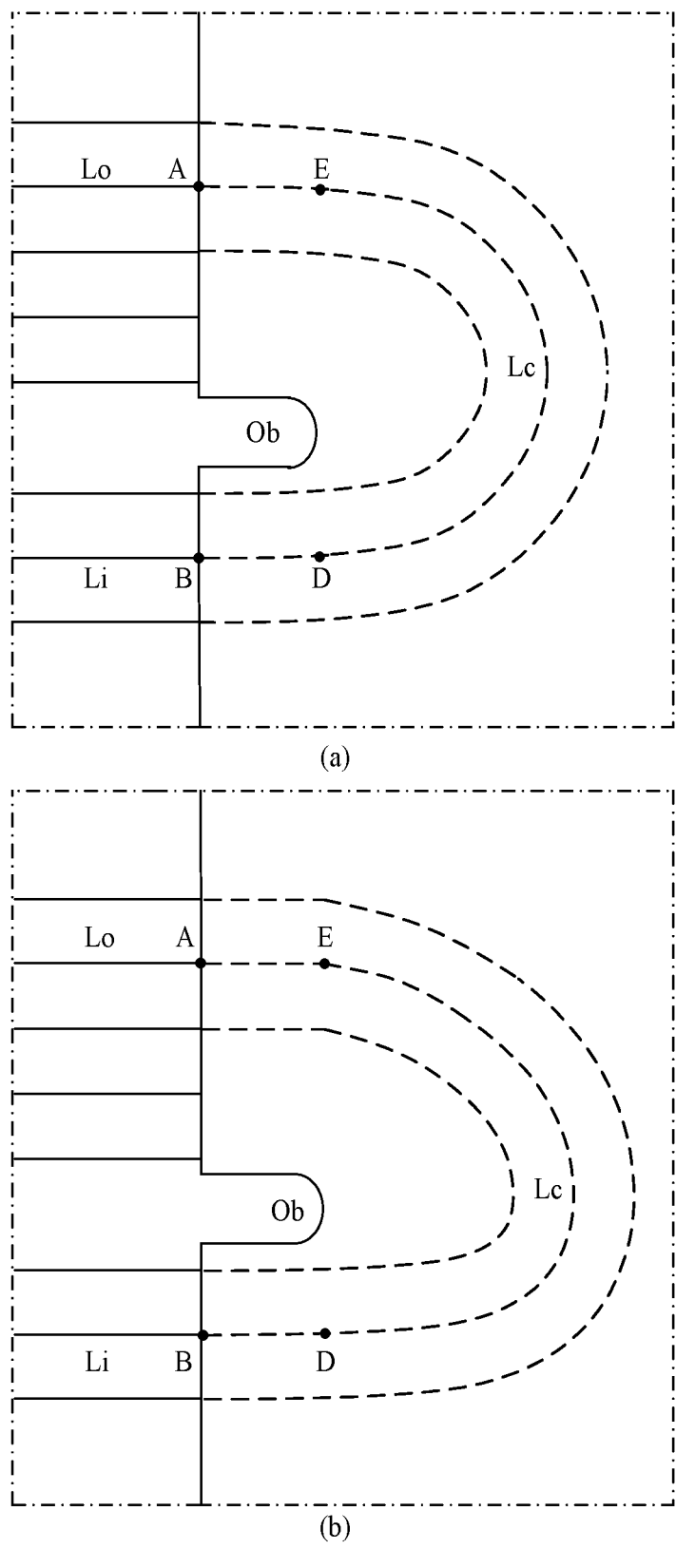
FIG. 9 is a schematic diagram of a method for automatically marking a U-turn lane line according to an embodiment.

FIG. 9 is a schematic diagram of a method for automatically marking a U-turn lane line according to an embodiment. In a scenario in FIG. 9, an entry lane line Li and an exit lane line Lo are lane center lines. The two lane lines are aligned. There is an obstacle Ob at a U-turn location. The entry lane line Li and the exit lane line Lo are asymmetric with respect to the obstacle Ob. In other words, a distance from the entry lane line to the obstacle is not equal to a distance from the exit lane line to the obstacle in a horizontal direction (a lane width direction). In this scenario, an intersection entry point is B, an intersection exit point is A, an entry projection end point of the obstacle Ob is D, and an exit projection end point is E. A U-turn lane line Lc marked on an electronic map is a lane center line, and includes a line segment BD used as an entry projection line, a curve DE used as a U-turn curve, and a line segment AE used as an exit projection line. In addition, in FIG. 9, two lane side lines at the U-turn location are also marked.

In the scenario in FIG. 9, when the U-turn curve is calculated, a midpoint of a line segment that connects an entry depth point and an exit depth point may be used as a control point. Alternatively, a midpoint may be not used. For example, a point, located in front of the obstacle, on the line segment in an entry direction is used. A shape of the calculated U-turn lane line is determined based on whether the midpoint is used. Herein, (a) in FIG. 9 presents a U-turn lane line calculated when the midpoint is used as a control point, and (b) in FIG. 9 presents a U-turn lane line calculated when the point located in front of the obstacle is used as a control point.

Figure 10:
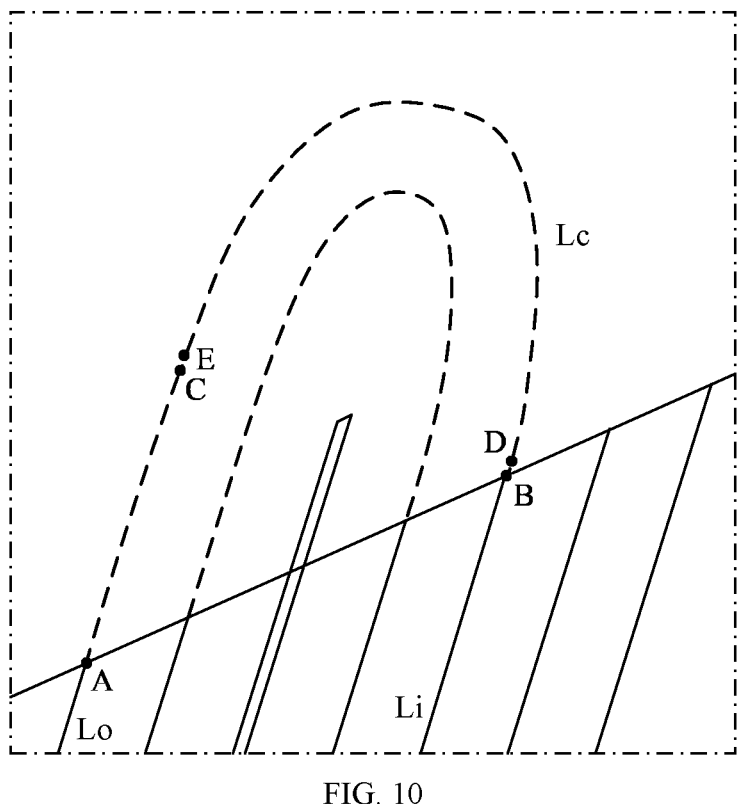
FIG. 10 is a schematic diagram of a method for automatically marking a U-turn lane line according to an embodiment.

FIG. 10 is a schematic diagram of a method for automatically marking a U-turn lane line according to an embodiment. In a scenario in FIG. 10, a stop line is not perpendicular to a lane line. An entry lane line Li and an exit lane line Lo are lane side lines. The two lane lines are not aligned. In addition, there is an obstacle Ob at a U-turn location. A width of the obstacle Ob is relatively small. A distance between the entry lane line Li and the exit lane line Lo is relatively small.

In this scenario, an intersection entry point is B, an intersection exit point is A, the exit lane line Lo is supplemented to a point C, an exit supplementing point is C, an exit supplementing line is a line segment AC, an entry projection end point of the obstacle Ob is D, and an exit projection end point is E. A U-turn lane line Lc marked on an electronic map is a lane side line, and includes a line segment BD used as an entry projection line, a curve DE used as a U-turn curve, a line segment CE used as an exit projection line, and the line segment AC used as the exit supplementing line. In this scenario, as shown in the figure, a lane center line and a lane side line on an outer side at the U-turn location may be marked, and a lane side line on an inner side may be not marked.

Figure 11:
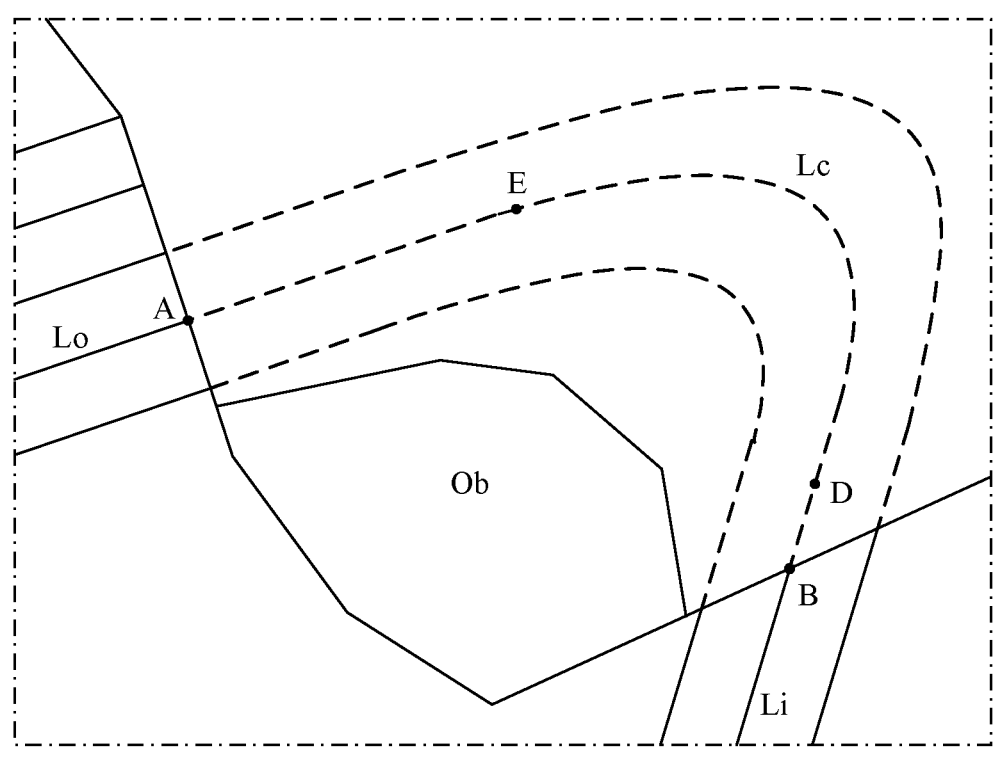
FIG. 11 is a schematic diagram of a method for automatically marking a U-turn lane line according to an embodiment.

FIG. 11 is a schematic diagram of a method for automatically marking a U-turn lane line according to an embodiment. In a scenario in FIG. 11, an entry lane line Li and an exit lane line Lo are lane center lines. An included angle between the two lane lines is relatively large. There is an obstacle Ob at an intersection U-turn location. In this scenario, the entry lane line Li and the exit lane line Lo are not supplemented. An intersection entry point is B, an intersection exit point is A, an entry projection end point of the obstacle Ob is D, an exit projection end point is E, and an entry projection line DB and an exit projection line CE have different lengths. A U-turn lane line Lc marked on an electronic map is a lane center line, and includes the entry projection line BD, a U-turn curve DE, and the exit projection line CE. In this scenario, when the curve DE used as the U-turn curve is calculated, an intersection point of the entry lane line Li and the exit lane line Lo may be used as a control point. In addition, in FIG. 9, two lane side lines at the U-turn location are also marked.

1.5 Summary of the First Implementation

At least the following manner may be obtained from the foregoing embodiments:

The method for automatically marking a U-turn lane line includes the following steps: obtaining information about a to-be-marked intersection, where the information about the to-be-marked intersection includes information about an intersection entry point, information about an intersection exit point, and information about an obstacle that is higher than a road surface of a road on which a vehicle travels and that hinders a U-turn of the vehicle at the to-be-marked intersection; and marking a U-turn lane line with a first depth, where the first depth is determined based on a second depth of the obstacle.

Herein, the intersection entry point may be determined based on an endpoint of an entry lane line of the to-be-marked intersection, and the intersection exit point may be determined based on an endpoint of an exit lane line of the to-be-marked intersection.

The first depth is a depth at which the U-turn lane line extends from the intersection entry point or the intersection exit point to the to-be-marked intersection. The first depth is, for example, the U-turn lane line depth in the foregoing embodiment.

The second depth is a distance from a farthest projection end of the obstacle on an extension line of the entry lane line to the to-be-marked intersection to the intersection entry point, or a distance from a farthest projection end of the obstacle on an extension line of the exit lane line to the to-be-marked intersection to the intersection exit point. The second depth is, for example, the obstacle depth in the foregoing embodiment. The farthest projection end of the obstacle on the extension line of the entry lane line to the to-be-marked intersection is, for example, the entry projection end point in the foregoing embodiment. The farthest projection end of the obstacle on the extension line of the exit lane line to the to-be-marked intersection is, for example, the exit projection end point in the foregoing embodiment.

In this manner, when there is the obstacle, the first depth of the U-turn lane line is determined based on the farthest projection end of the obstacle on the extension line of the entry lane line or the exit lane line. Therefore, in comparison with a case in which there is no obstacle, the U-turn lane line that extends to the to-be-marked intersection at a relatively large depth can be automatically marked, to avoid collision with the obstacle during the U-turn of the vehicle. In this way, the automatically marked U-turn lane line does not need to be manually adjusted, or a time used for manual adjustment can be reduced.

The U-turn lane line may include a straight-line part and a curve part; and the first depth includes a straight-line depth of the straight-line part and a curve depth of the curve part, and the straight line depth is determined based on the intersection entry point, the intersection exit point, and the farthest projection end of the obstacle. The straight-line part is, for example, the entry supplementing line, the exit supplementing line, the entry projection line, or the exit projection line in the foregoing embodiment. The straight-line depth is, for example, the entry-side straight line depth or the exit-side straight line depth in the foregoing embodiment. The curve part is, for example, the U-turn curve in the foregoing embodiment. The curve depth is, for example, the curve depth in the foregoing embodiment.

In this manner, the U-turn lane line includes the straight-line part and the curve part, so that the marked U-turn lane line can better conform to an actual travel track of the vehicle.

The straight line part may include a first straight line part with a first straight line depth and a second straight line part with a second straight line depth, the first straight line part extends from the intersection entry point to the to-be-marked intersection, and the second straight line part extends from the intersection exit point to the to-be-marked intersection; and the curve part is connected between the first straight line part and the second straight line part.

The first straight line depth may be the distance from the farthest projection end of the obstacle on the extension line of the entry lane line to the to-be-marked intersection to the intersection entry point, and the second straight line depth may be the distance from the farthest projection end of the obstacle on the extension line of the exit lane line to the to-be-marked intersection to the intersection exit point.

The first straight line part is, for example, the entry supplementing line or the entry projection line in the foregoing embodiment. The first straight line depth is, for example, the entry-side straight line depth in the foregoing embodiment. The second straight line part is, for example, the exit supplementing line or the exit projection line in the foregoing embodiment. The second straight line depth is, for example, the exit-side straight line depth in the foregoing embodiment.

The curve depth may be determined based on the farthest projection end of the obstacle on the extension line of the entry lane line to the to-be-marked intersection, the farthest projection end of the obstacle on the extension line of the exit lane line to the to-be-marked intersection, and vehicle length information.

Herein, the farthest projection end of the obstacle on the extension line of the entry lane line to the to-be-marked intersection may be used as a start point of the curve part, and the farthest projection end of the obstacle on the extension line of the exit lane line to the to-be-marked intersection is used as an end point. At least one control point is determined based on the vehicle length information, to determine the curve part and further determine the curve depth. The curve part may be determined by using a Bézier curve or a spline curve.

In this manner, the curve depth is further determined based on the vehicle length information, and a proper U-turn lane line can be marked based on different vehicle types such as a car and a truck, so that the marked U-turn lane line better conforms to an actual travel track of the vehicle.

The obtaining information about a to-be-marked intersection may include: constructing a planned U-turn region based on the intersection entry point, the intersection exit point, and the vehicle length information; and obtaining the information about the obstacle that is higher than the road surface of the road on which the vehicle travels and that hinders the U-turn of the vehicle in the planned U-turn region.

In this manner, whether there is the obstacle that hinders the U-turn is determined based on the intersection entry point, the intersection exit point, and the vehicle length information. Therefore, the obstacle that hinders the U-turn can be reliably determined.

A polygonal region may be constructed as the planned U-turn region based on the intersection entry point, the intersection exit point, and a tentative entry depth point and a tentative exit depth point that are obtained based on the vehicle length information. When the intersection entry point is not aligned with the intersection exit point, the entry supplementing point and the exit supplementing point may also be obtained based on the intersection entry point and the intersection exit point. The planned U-turn region is constructed based on the entry supplementing point, the exit supplementing point, the tentative entry depth point, and the tentative exit depth point.

When the planned U-turn region is constructed based on the entry supplementing point and the exit supplementing point, because the entry supplementing point and the exit supplementing point are closer to an inner side of the to-be-marked intersection, a projection point of the obstacle is calculated based on the entry supplementing point and the exit supplementing point. Therefore, a calculation load of calculating the projection point to obtain the farthest projection end can be reduced, and a time used for automatically marking the U-turn lane line can be reduced.

2. Apparatus for Automatically Marking a U-Turn Lane Line in a Second Implementation The foregoing describes in detail the embodiments of the method for automatically marking a U-turn lane line in the first implementation with reference to FIG. 1 to FIG. 11. The following describes in detail an embodiment of an apparatus for automatically marking a U-turn lane line provided in an embodiment with reference to FIG. 12. It should be understood that the description of the method embodiment corresponds to the description of the apparatus embodiment. Therefore, for a part that is not described in detail in the apparatus embodiment, refer to the foregoing method embodiment.

Figure 12:
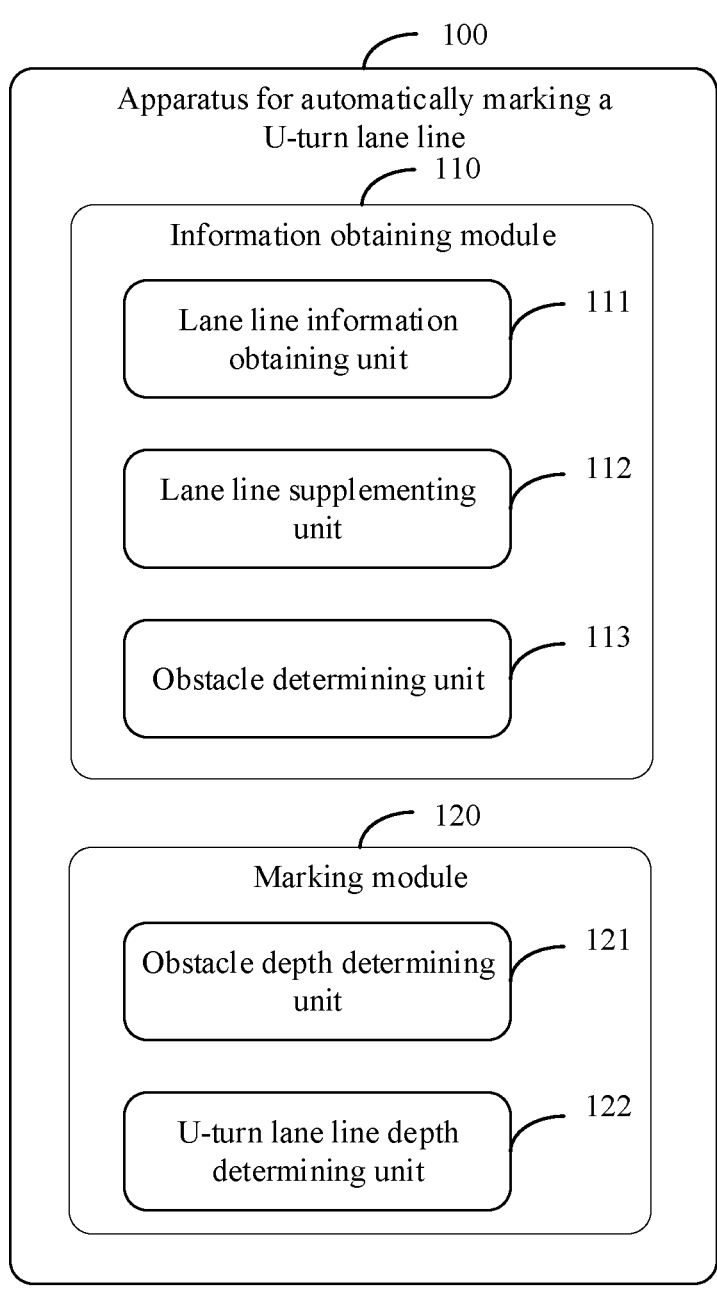
FIG. 12 is a schematic diagram of a structure of an apparatus for automatically marking a U-turn lane line according to an embodiment.

FIG. 12 is a schematic diagram of a structure of an apparatus 100 for automatically marking a U-turn lane line. The apparatus 100 for marking a U-turn lane line includes an information obtaining module 110 and a marking module 150.

The information obtaining module 110 is configured to obtain information about a to-be-marked intersection. The information about the to-be-marked intersection includes information about an intersection entry point, information about an intersection exit point, and information about an obstacle that is higher than a road surface of a road on which a vehicle travels and that hinders a U-turn of the vehicle at the to-be-marked intersection.

The information obtaining module 110 includes a lane line information obtaining unit 111, a lane line supplementing unit 112, and an obstacle determining unit 113. Alternatively, the information obtaining module 110 may not include the lane line supplementing unit 112.

The lane line information obtaining unit 111 is configured to obtain an intersection entry point and an intersection exit point. The intersection entry point may be determined based on an endpoint of an entry lane line of the to-be-marked intersection. The intersection exit point may be determined based on an endpoint of an exit lane line of the to-be-marked intersection.

The lane line supplementing unit 112 is configured to: when the entry lane line is not aligned with the exit lane line, supplement the entry lane line and the exit lane line to the to-be-marked intersection.

The obstacle determining unit 113 is configured to determine the obstacle that is higher than the road surface of the road on which the vehicle travels and that hinders the U-turn of the vehicle in the to-be-marked intersection. The obstacle determining unit 113 may construct a planned U-turn region based on the intersection entry point, the intersection exit point, and vehicle length information; and determine the obstacle that is higher than the road surface of the road on which the vehicle travels and that hinders the U-turn of the vehicle in the planned U-turn region.

The marking module 120 is configured to mark a U-turn lane line with a U-turn lane line depth. The U-turn lane line depth is determined based on an obstacle depth of the obstacle that is higher than the road surface of the road on which the vehicle travels and that hinders the U-turn of the vehicle in the to-be-marked intersection. The U-turn lane line depth is equivalent to a first depth. The obstacle depth is equivalent to a second depth.

The marking module 120 includes an obstacle depth determining unit 121 and a U-turn lane line depth determining unit 122.

The obstacle depth determining unit 121 is configured to determine the obstacle depth. The obstacle depth determining unit 121 obtains a distance from a farthest projection end of the obstacle on an extension line of the entry lane line to the to-be-marked intersection to the intersection entry point, and a distance from a farthest projection end of the obstacle on an extension line of the exit lane line to the to-be-marked intersection to the intersection exit point, and determines the obstacle depth. The farthest projection end of the obstacle on the extension line of the entry lane line to the to-be-marked intersection is, for example, the entry projection end point in the foregoing embodiment. The farthest projection end of the obstacle on the extension line of the exit lane line to the to-be-marked intersection is, for example, the exit projection end point in the foregoing embodiment.

The U-turn lane line depth determining unit 122 is configured to determine a U-turn lane line depth. The U-turn lane line depth determining unit 122 determines a straight-line depth of a straight-line part included in the U-turn lane line and a curve depth of a curve part included in the U-turn lane line.

The U-turn lane line depth determining unit 122 determines the straight-line depth based on the farthest projection ends of the obstacle on the extension lines of the entry lane line and the exit lane line to the to-be-marked intersection. Specifically, the U-turn lane line depth determining unit 122 determines a first straight line depth of a first straight line part included in the straight-line part of the U-turn lane line.

The U-turn lane line depth determining unit 122 further determines a second straight line depth of a second straight line part included in the straight-line part of the U-turn lane line. Herein, the first straight line depth is, for example, a distance from the farthest projection end of the obstacle on the extension line of the entry lane line to the to-be-marked intersection to the intersection entry point. The second straight line depth is, for example, a distance from the farthest projection end of the obstacle on the extension line of the exit lane line to the to-be-marked intersection to the intersection exit point.

The U-turn lane line depth determining unit 122 further determines the curve depth based on the vehicle length information. Specifically, the farthest projection end of the obstacle on the extension line of the entry lane line to the to-be-marked intersection may be used as a start point of the curve part, and the farthest projection end of the obstacle on the extension line of the exit lane line to the to-be-marked intersection is used as an end point. At least one control point is determined based on the vehicle length information, to determine the curve depth.

In this way, the U-turn lane line depth determining unit 122 can determine a distance from a farthest projection end of the U-turn lane line on the extension line of the entry lane line to the to-be-marked intersection to the intersection entry point, and a distance from a farthest projection end of the U-turn lane line on the extension line of the exit lane line to the to-be-marked intersection to the intersection exit point. In this way, the U-turn lane line depth determining unit 122 can determine the U-turn lane line depth.

The U-turn lane line depth is determined in the manner described above. The marking module 120 can mark the U-turn lane line including the following parts: the first straight line part that extends from the intersection entry point to the to-be-marked intersection and that has the first straight line depth; the second straight line part that extends from the intersection exit point to the to-be-marked intersection and that has the second straight line depth; and the curve part that is connected between the first straight line part and the second straight line part and that has the curve depth.

When the apparatus 100 for automatically marking a U-turn lane line in the second implementation is used, and there is an obstacle, the first depth of the U-turn lane line is determined based on the farthest projection end of the obstacle on the extension line of the entry lane line or the exit lane line. Therefore, in comparison with a case in which there is no obstacle, the U-turn lane line that extends to the to-be-marked intersection at a relatively large depth can be automatically marked, to avoid collision with the obstacle during the U-turn of the vehicle. In this way, the automatically marked U-turn lane line does not need to be manually adjusted, or a time used for manual adjustment can be reduced.

3. Computing Device in a Third Implementation

Figure 13:
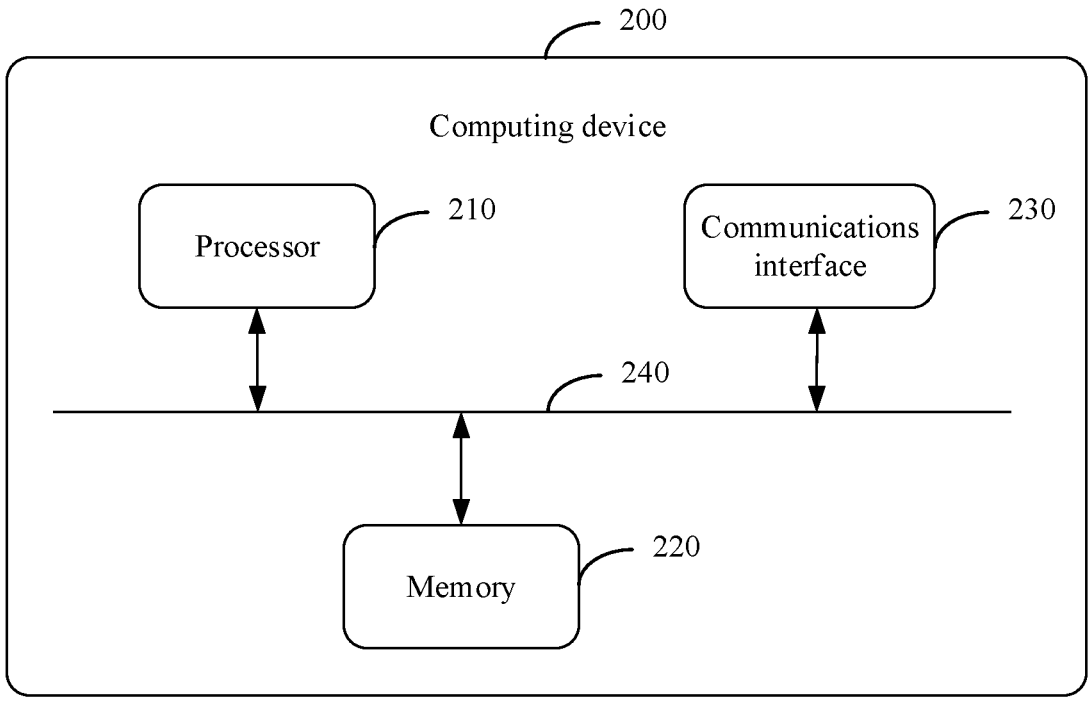
FIG. 13 is a schematic diagram of a structure of a computing device according to an embodiment.

A fourth implementation provides a computing device. FIG. 13 is a schematic diagram of a structure of a computing device 200 according to an embodiment. The computing device 200 includes a processor 210, a memory 220, a communications interface 230, and a bus 240.

It should be understood that the communications interface 230 in the computing device 200 shown in FIG. 13 may be configured to communicate with another device.

The processor 210 may be connected to the memory 220. The memory 220 may be configured to store program code and data. Therefore, the memory 220 may be a storage unit in the processor 210, an external storage unit independent of the processor 210, or a component including a storage unit in the processor 210 and an external storage unit independent of the processor 210.

Optionally, the computing device 200 may further include a bus 240. The memory 220 and the communications interface 230 may be connected to the processor 210 through the bus 240. The bus 240 may be a Peripheral Component Interconnect (PCI) bus, an Extended Industry Standard Architecture (EISA) bus, or the like. The bus 240 may be classified into an address bus, a data bus, a control bus, and the like. For ease of representation, only one line is used to represent the bus in FIG. 13, but this does not mean that there is only one bus or only one type of bus.

The processor 210 may be a central processing unit (CPU). The processor may be alternatively a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor. Alternatively, the processor 210 uses one or more integrated circuits, and is configured to execute a related program, to implement the technical solutions provided in the embodiments.

The memory 220 may include a read-only memory and a random-access memory (RAM), and provide instructions and data to the processor 210. A part of the processor 210 may further include a non-volatile RAM. For example, the processor 210 may further store device type information.

When the computing device 200 is run, the processor 210 executes computer executable instructions in the memory 220 to perform operation steps of the method for automatically marking a U-turn lane line provided in the embodiments.

It should be understood that the computing device 200 provided in this embodiment may be used as the apparatus for automatically marking a U-turn lane line provided in the embodiments, to perform the method for automatically marking a U-turn lane line provided in the embodiments. The foregoing and other operations and/or functions of the modules in the computing device 200 are respectively used to implement corresponding procedures of the methods in the embodiments. For brevity, details are not described herein again.

4. Computer-Readable Storage Medium in a Fourth Implementation

The fourth implementation provides a computer-readable storage medium. The computer-readable storage medium stores a computer program. When being executed by a processor, the program is used to perform at least one of the methods for automatically marking a U-turn lane line described in the foregoing embodiments.

The computer-storage medium in this embodiment may be any combination of one or more computer-readable media. The computer-readable medium may be a computer-readable signal medium or a computer-readable storage medium. The computer-readable storage medium may be but is not limited to an electrical, a magnetic, an optical, an electromagnetic, an infrared, or a semiconductor system, apparatus, or device, or any combination thereof. More specific examples (a non-exhaustive list) of the computer-readable storage medium include an electrical connection having one or more wires, a portable computer disk, a hard disk, a RAM, a read-only memory (ROM), an erasable programmable ROM (EPROM) or flash memory, an optical fiber, a portable compact disc ROM (CD-ROM), an optical storage device, a magnetic storage device, or any proper combination thereof. In this document, the computer-readable storage medium may be any tangible medium including or storing a program that may be used by an instruction execution system, apparatus, or device, or be used in combination with an instruction execution system, apparatus, or device.

A computer-readable signal medium may include a data signal that is propagated in a baseband or as a part of a carrier, and carries computer-readable program code. Such a propagated data signal may take a variety of forms, including but not limited to an electromagnetic signal, an optical signal, or any proper combination thereof. The computer-readable signal medium may be alternatively any computer-readable medium other than the computer-readable storage medium. The computer-readable medium may send, propagate, or transmit the program used by the instruction execution system, apparatus, or device, or used in combination with the instruction execution system, apparatus, or device.

Program code included in the computer-readable medium may be transmitted by using any proper medium, including but not limited to wireless, electric wire, an optical cable, RF, or any proper combination thereof.

Computer program code used to perform operations may be written in one or more program design languages or a combination thereof. The program design language includes an object-oriented program design language such as Java, Smalltalk, and C++, and further includes a procedural program design language such as a "C" language or a similar program design language. The program code may be executed entirely on a user computer, or some may be executed on a user computer as a separate software package, or some may be executed on a user computer while some is executed on a remote computer, or the code may be entirely executed on a remote computer or a server. When a remote computer is involved, the remote computer may be connected to a user computer by using any type of network, including a local area network (LAN) or a wide area network (WAN), or may be connected to an external computer (for example, connected by using an Internet service provider through the Internet).

5. Computer Program in a Fifth Implementation

The fifth implementation provides a computer program. When running the program, a computer can perform the method for automatically marking a U-turn lane line provided in the embodiments, or function as the foregoing apparatus for automatically marking a U-turn lane line.

6. Map in a Sixth Implementation

The sixth implementation provides a map. The map includes a U-turn lane line that is marked at a U-turn intersection by using the method for automatically marking a U-turn lane line provided in the embodiments. It can be learned from the description of the method for marking a U-turn lane line that the map includes a U-turn lane line with a first depth. The first depth is determined based on a second depth of an obstacle that is higher than a road surface of a road on which a vehicle travels and that hinders a U-turn of the vehicle at the U-turn intersection. The first depth is a depth at which the U-turn lane line extends from an intersection entry point or an intersection exit point to the U-turn intersection.

By using such a map, the vehicle can safely perform a U-turn action without colliding with the obstacle when performing self-driving based on the map.

In addition, another specific structure of the map, especially, a structure of the U-turn lane line may be learned from the description of the foregoing implementation (simply refer to FIG. 4, FIG. 7, FIG. 8, FIG. 8, FIG. 10, and the like). Therefore, a detailed description of the map is omitted herein.

It should be noted that the foregoing is merely exemplary embodiments and technical principles of this disclosure. A person skilled in the art may understand that this disclosure is not limited to specific embodiments described herein, and a person skilled in the art may make various obvious changes, readjustments, and replacements without departing from the protection scope of this disclosure. Therefore, although this disclosure is described in detail by using the foregoing embodiments, this disclosure is not limited to the foregoing embodiments, and may further include more other equivalent embodiments without departing from the concept of this disclosure. These embodiments all fall within the protection scope of this disclosure.

What is claimed is:

1. An apparatus comprising:

at least one memory configured to store program instructions; and at least one processor coupled to the at least one memory and configured to execute the program instructions to cause the apparatus to:

obtain first information about a to-be-marked intersection and comprising second information about an intersection entry point, third information about an intersection exit point, and fourth information about an obstacle that is higher than a road surface of a road on which a vehicle travels and that hinders a U-turn of the vehicle at the to-be-marked intersection, wherein the intersection entry point is based on a first endpoint of an entry lane line of the to-be-marked intersection, and wherein the intersection exit point is based on a second endpoint of an exit lane line of the to-be-marked intersection;

mark a U-turn lane line with a first depth by drawing the U-turn lane line with the first depth on an electronic map to obtain an updated electronic map, wherein the first depth is based on a second depth of the obstacle, wherein the first depth is a depth at which the U-turn lane line extends from the intersection entry point or the intersection exit point to the to-be-marked intersection, and wherein the second depth is a first distance from a first farthest projection end of the obstacle on a first extension line of the entry lane line to the intersection entry point or is a second distance from a second farthest projection end of the obstacle on a second extension line of the exit lane line to the intersection exit point; and cause the vehicle to perform the U-turn using self-driving and based on the updated electronic map.

2. The apparatus of claim 1, wherein the U-turn lane line comprises a straight-line part and a curve part, wherein first depth comprises a straight-line depth of the straight-line part and a curve depth of the curve part, and wherein the straight-line depth is based on the intersection entry point, the intersection exit point, and the first farthest projection end or the second farthest projection end.

3. The apparatus of claim 2, wherein the straight-line part comprises a first straight-line part with a first straight-line depth and a second straight-line part with a second straight-line depth, wherein the first straight-line part extends from the intersection entry point to the to-be-marked intersection, wherein the second straight-line part extends from the intersection exit point to the to-be-marked intersection, and wherein the curve part is connected between the first straight-line part and the second straight-line part.

4. The apparatus of claim 3, wherein the first straight-line depth is the first distance, and wherein the second straight-line depth is the second distance.

5. The apparatus of claim 2, wherein the curve depth is based on the first farthest projection end, the second farthest projection end, and vehicle length information of the vehicle.

6. The apparatus of claim 5, wherein the at least one processor is further configured to execute the program instructions to cause the apparatus to:

construct a planned U-turn region based on the intersection entry point, the intersection exit point, and the vehicle length information; and obtain the fourth information.

7. A method comprising:

obtaining first information about a to-be-marked intersection and comprising second information about an intersection entry point, third information about an intersection exit point, and fourth information about an obstacle that is higher than a road surface of a road on which a vehicle travels and that hinders a U-turn of the vehicle at the to-be-marked intersection, wherein the intersection entry point is based on a first endpoint of an entry lane line of the to-be-marked intersection, and wherein the intersection exit point is based on a second endpoint of an exit lane line of the to-be-marked intersection;

marking a U-turn lane line with a first depth by drawing the U-turn lane line with the first depth on an electronic map to obtain an updated electronic map, wherein the first depth is based on a second depth of the obstacle, wherein the first depth is a depth at which the U-turn lane line extends from the intersection entry point or the intersection exit point to the to-be-marked intersection, and wherein the second depth is a first distance from a first farthest projection end of the obstacle on a first extension line of the entry lane line to the intersection entry point or is a second distance from a second farthest projection end of the obstacle on a second extension line of the exit lane line to the intersection exit point; and causing the vehicle to perform the U-turn using self-driving and based on the updated electronic map.

8. The method of claim 7, wherein the U-turn lane line comprises a straight-line part and a curve part, wherein the first depth comprises a straight-line depth of the straight-line part and a curve depth of the curve part, and wherein the straight-line depth is based on the intersection entry point, the intersection exit point, and the first farthest projection end or the second farthest projection end.

9. The method of claim 8, wherein the straight-line part comprises a first straight-line part with a first straight-line depth and a second straight-line part with a second straight-line depth, wherein the first straight-line part extends from the intersection entry point to the to-be-marked intersection, wherein the second straight-line part extends from the intersection exit point to the to-be-marked intersection, and wherein the curve part is connected between the first straight-line part and the second straight-line part.

10. The method of claim 9, wherein the first straight-line depth is the first distance, and wherein the second straight-line depth is the second distance.

11. The method of claim 8, wherein the curve depth is based on the first farthest projection end, the second farthest projection end, and vehicle length information of the vehicle.

12. The method of claim 11, further comprising:

constructing a planned U-turn region based on the intersection entry point, the intersection exit point, and the vehicle length information; and obtaining the fourth information.

13. A computer program product comprising instructions that are stored on a non-transitory computer-readable medium and that, when executed by at least one processor, cause an apparatus to:

obtain first information about a to-be-marked intersection and comprising second information about an intersection entry point, third information about an intersection exit point, and fourth information about an obstacle that is higher than a road surface of a road on which a vehicle travels and that hinders a U-turn of the vehicle at the to-be-marked intersection, wherein the intersection entry point is based on a first endpoint of an entry lane line of the to-be-marked intersection, and wherein the intersection exit point is based on a second endpoint of an exit lane line of the to-be-marked intersection;

mark a U-turn lane line with a first depth by drawing the U-turn lane line with the first depth on an electronic map to obtain an updated electronic map, wherein the first depth is based on a second depth of the obstacle, wherein the first depth is a depth at which the U-turn lane line extends from the intersection entry point or the intersection exit point to the to-be-marked intersection, and wherein the second depth is a first distance from a first farthest projection end of the obstacle on a first extension line of the entry lane line to the intersection entry point or is a second distance from a second farthest projection end of the obstacle on a second extension line of the exit lane line to the intersection exit point; and cause the vehicle to perform the U-turn using self-driving and based on the updated electronic map.

14. The computer program product of claim 13, wherein the U-turn lane line comprises a straight-line part and a curve part, wherein the first depth comprises a straight-line depth of the straight-line part and a curve depth of the curve part, and wherein the straight-line depth is based on the intersection entry point, the intersection exit point, and the first farthest projection end or the second farthest projection end.

15. The computer program product of claim 14, wherein the straight-line part comprises a first straight-line part with a first straight-line depth and a second straight-line part with a second straight-line depth, wherein the first straight-line part extends from the intersection entry point to the to-be-marked intersection, wherein the second straight-line part extends from the intersection exit point to the to-be-marked intersection, and wherein the curve part is connected between the first straight-line part and the second straight-line part.

16. The computer program product of claim 15, wherein the first straight-line depth is the first distance, and wherein the second straight-line depth is the second distance.

17. The computer program product of claim 14, wherein the curve depth is based on the first farthest projection end, the second farthest projection end, and vehicle length information of the vehicle.

18. The apparatus of claim 1, wherein the second depth is the first distance.

19. The apparatus of claim 1, wherein the second depth is the second distance.

20. The computer program product of claim 17, wherein the instructions, when executed by the at least one processor, further cause the apparatus to:

construct a planned U-turn region based on the intersection entry point, the intersection exit point, and the vehicle length information; and obtain the fourth information.

* * * * *